United States Patent
Nardine, III et al.

(10) Patent No.: US 7,387,083 B2
(45) Date of Patent: Jun. 17, 2008

(54) PRECISION WATERING METHOD AND APPARATUS

(75) Inventors: John Harold Nardine, III, Glen Head, NY (US); Darrell Lawrence Iehle, Mastic, NY (US); Carol Ann Novotney, New York, NY (US)

(73) Assignee: Life Science Control Corporation, College Point, NY (US)

( * ) Notice: Subject to any disclaimer, the term of this patent is extended or adjusted under 35 U.S.C. 154(b) by 31 days.

(21) Appl. No.: 11/295,709

(22) Filed: Dec. 6, 2005

(65) Prior Publication Data

US 2007/0125307 A1 Jun. 7, 2007

(51) Int. Cl.
*A01K 7/00* (2006.01)

(52) U.S. Cl. .......................................... 119/72; 119/74
(58) Field of Classification Search ................. 119/72, 119/51.02, 51.5, 74, 75, 842
See application file for complete search history.

(56) References Cited

U.S. PATENT DOCUMENTS

| | | | |
|---|---|---|---|
| 4,433,577 A * | 2/1984 | Khurgin et al. ........... 73/290 V |
| RE32,101 E | 4/1986 | Ricciardi et al. | |
| 4,797,820 A | 1/1989 | Wilson et al. | |
| 5,673,647 A * | 10/1997 | Pratt ....................... 119/51.02 |
| 5,764,522 A | 6/1998 | Shalev | |
| 6,000,361 A * | 12/1999 | Pratt ....................... 119/51.02 |
| 6,209,576 B1 | 4/2001 | Davis | |
| 6,253,708 B1 | 7/2001 | Johnson | |
| 6,318,289 B1 * | 11/2001 | Pratt ....................... 119/51.02 |
| 6,443,093 B1 * | 9/2002 | van der Lely et al. .... 119/14.01 |
| 6,516,746 B2 | 2/2003 | Pratt | |
| 6,517,707 B2 | 2/2003 | Giordano et al. | |
| 6,542,850 B2 | 4/2003 | Ulman et al. | |
| 6,708,722 B1 | 3/2004 | Goodenough | |
| 6,805,075 B2 * | 10/2004 | Pratt ....................... 119/51.02 |
| 6,895,893 B2 * | 5/2005 | Larsen ..................... 119/51.02 |
| 2001/0011527 A1 * | 8/2001 | Ulman et al. ............ 119/51.01 |
| 2005/0000458 A1 * | 1/2005 | Pratt ....................... 119/51.02 |
| 2006/0011144 A1 * | 1/2006 | Kates ......................... 119/719 |

* cited by examiner

*Primary Examiner*—Yvonne R. Abbott
(74) *Attorney, Agent, or Firm*—Law Offices of Rita Chipperson, P.C.

(57) ABSTRACT

A method and apparatus for accurately dispensing, monitoring, quantifying, and controlling liquids provided to one or more animals. In some embodiments, a standalone apparatus having a local user interface is coupled to a liquid source and drinking assembly to monitor, quantify, and control the liquid consumption of one or more specific animals. In other embodiments, multiple standalone apparatuses are each coupled to a liquid source and a respective drinking assembly to monitor, quantify, and control the liquid consumed through the respective drinking assembly. In this scenario, each of the standalone apparatuses shares one or more common remote user interface panels. In yet another embodiment, standalone apparatuses are networked to other standalone apparatuses. User workstations and central control panels resident on the watering apparatus network, or a third-party network interfaced to the network, allow liquid consumption to be monitored, controlled, and quantified both locally and remotely.

23 Claims, 11 Drawing Sheets

PRECISION WATERING METHOD AND APPARATUS

BACKGROUND OF THE INVENTION

Embodiments of the present invention generally relate to aids for efficiently and effectively dispensing liquids. More specifically, the present invention relates to a method and apparatus for accurately dispensing, monitoring, quantifying, and controlling liquids provided to one or more animals.

Many systems and methods have been created to provide water and feed to animals such as livestock. Some such systems are designed to dispense predetermined quantities of feed or liquids at daily predetermined times. In one form, a quantity of animal feed is measured based upon criteria such as weight or volume. After measurement, the feed is transferred to an intermediate hopper, which then transfers the feed to the animal. Other similar systems allow an animal to access feed through an opening in a hopper that is sized such that the feed is larger than the opening, thereby restricting the amount of feed available to the animal. In such a system, the animal gnaws the feed accessible through the opening, and, upon consumption of a desired amount of feed, the opening is closed to prevent further consumption. Some such systems are activated or controlled manually by one or more users, while others automatically dispense food at pre-programmed times. In addition, some such systems are designed to feed a single animal, whereas others are designed for several animals.

Similarly, feeding and watering systems have been designed for large herds of animals such as cattle. In some such systems, each animal of the herd has an electronic tag or collar for identification. At feeding time, the cattle are herded into stalls. Individual stall gates close after one of the animals enters the respective stall, forcing the remaining cattle to continue into other unoccupied stalls. Once an animal is contained in a stall and the gate is closed, a feeder dispenses a specific, predetermined quantity of feed based upon the electronic information provided by the animal's electronic tag or collar.

In addition to dry food such as feed, systems and methods are available for dispensing water or other liquids to animals. In its most simplistic form, a water reservoir is connected to a valve that is accessible to the animal. When the animal actuates the valve, typically by pressing on the valve with its mouth, water is released. Examples range from individual water bottles for gerbils or similar rodents to more complex, networked drinking systems for animals such as poultry or cattle. Some such systems are equipped with manual or automatic purge cycles to remove stale or contaminated water from the drinking lines.

Distinct from animal watering systems, many other systems and methods have been created to control water flow. Some of these systems and methods have been designed to terminate water flow based on various user-determined parameters. In one such system, water flow is terminated when a hazardous or wasteful condition occurs. Some examples include water flow termination due to broken pipes or water mains, leaking pipes or water mains, and continuously running toilets. These systems include a water flow meter for detection of the hazardous or wasteful condition and an electronic shut-off valve for termination of water flow.

Similarly, products have been created to terminate water flow before a hazardous or wasteful situation occurs. For example, some systems terminate water flow upon the occurrence of a pressure increase in a pipe, hose, or water main. Other such systems terminate water flow when continuous flow occurs beyond a predetermined time period. Other similar systems totalize water flow and indicate the need for replacement of a water treatment filter or the like when totalized water flow exceeds a predetermined value.

In addition to systems and methods for terminating water flow, systems and methods have also been created to supply water to a variety of elements such as nozzles and the like in predetermined quantities and at predetermined times. Some such systems include supermarket produce and lawn sprinkler systems. Such systems are typically pre-programmed with a time schedule for systematically supplying water to each nozzle in the system simultaneously or to individual nozzles at corresponding dedicated times.

However, what is needed is a more effective system and method for accurately quantifying and controlling liquids provided to one or more individual, manually-actuated valves that may be optimized, at a user's discretion, to simultaneously perform multiple functions including, but not limited to: providing liquids to one or more animals simultaneously, monitoring each individual animal's liquid consumption, controlling the quantity of liquid consumed by each individual animal during one drinking event, controlling the quantity of liquid consumed by each individual animal during a predetermined time period, controlling time lapse between consecutive drinking events, allowing one or more users to alter each individual animal's drinking parameters, preventing wasteful liquid flow, accurately quantifying each animal's liquid consumption, and providing alarms to all system users simultaneously.

BRIEF SUMMARY OF THE INVENTION

Briefly stated, in one aspect of the present invention, an apparatus is disclosed for watering animals. This apparatus includes: at least one control unit executing at least one algorithm; at least one flow measurement device coupled to the control unit for measuring at least one flow of at least one liquid consumed by at least one of the animals; and at least one purge mechanism coupled to the control unit, wherein the algorithm utilizes data collected from the at least one flow measurement device to quantify at least one liquid consumed by at least one of the animals and wherein the algorithm utilizes data collected from the purge mechanism to increase at least one accuracy of at least one of the quantities of the at least one liquid consumed by at least one of the animals.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments that are presently preferred. It should be understood, however, that the invention is not limited to the precise arrangements and instrumentalities shown. In the drawings.

DETAILED DESCRIPTION OF THE INVENTION

Figure 1:
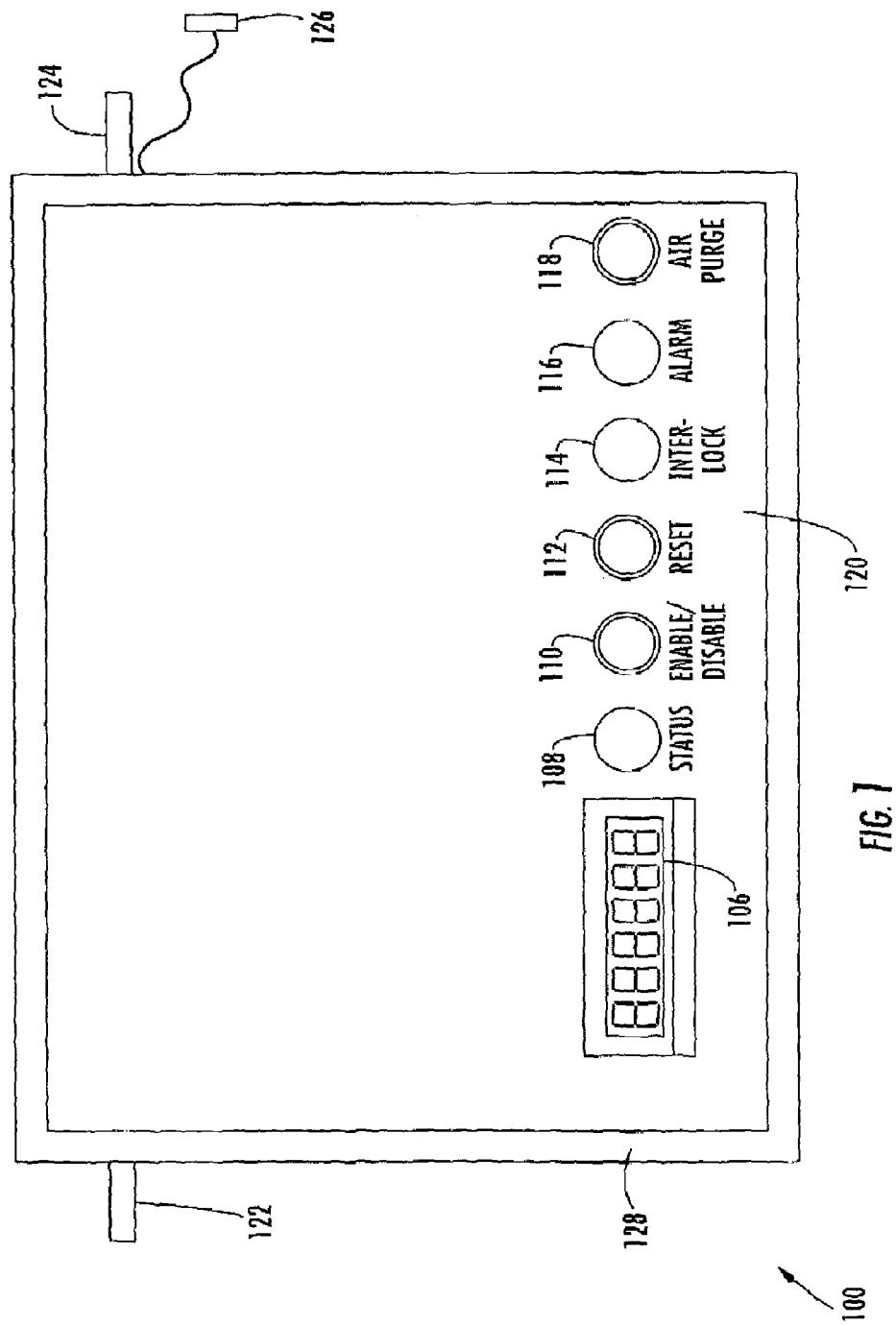
FIG. 1 depicts a perspective view of the exterior of a watering apparatus in accordance with an embodiment of the present invention including, inter alia, inlet and outlet couplings, a user interface, and an interlock sensor.

A watering apparatus for distributing water or other liquids to one or more animals is provided in one aspect of the present invention. In one embodiment of the present invention, the watering apparatus contains a control unit that is coupled to one or more flow control device(s), one or more flow measurement device(s), one or more totalizer(s), and one or more user interface(s) via hardwired or wireless connections or some combination thereof.

The watering apparatus is connected to a liquid source and a drinking assembly via couplings such as a quick disconnect fittings or quick connect couplings. In some embodiments, the watering apparatus is designed for compatibility with readily available couplings that are commonly known and used in the field of animal watering. Such compatibility facilitates use of the present invention with a user's existing animal watering equipment (e.g., drinking assemblies, hoses, etc.), thereby, minimizing the cost of implementing the present invention in pre-existing environments such as vivariums.

In one embodiment of the present invention, the watering apparatus performs a process that actuates the flow control device(s) and receives data from sensors such as flow measurement devices, totalizers, interlock sensors, etc. In some embodiments, such processes are performed by processors and electrical or electronic components under the control of computer-readable and computer-executable instructions. The computer-readable and computer-executable instructions reside, for example, in data storage features, memory, registers, and other components of a computer system, microprocessor, control unit, or the like.

Preferably, the aforementioned process is customizable based upon a user's requirements and downloaded to a control unit or the like. However, other methods of loading the control unit such as burning or programming an interchangeable Erasable Programmable Read Only Memory ("EPROM"), re-programming an Electrically Erasable Programmable ROM ("EEPROM"), or programming a microprocessor may be incorporated without departing from the scope of the present invention.

The process of the present invention monitors the various inputs and sensors, actuates the flow control device(s) and other outputs (e.g., alarm lamps), and provides and receives data to and from a system user, respectively, via a user interface. An animal's liquid consumption is calculated from data received from high accuracy devices such as flow meters. Such calculated liquid consumption is further analyzed by the process of the present invention to determine the appropriate steps for controlling the respective animal's current or future liquid intake. Based upon the predetermined and/or pre-programmed requirements, the process determines whether to inhibit or increase the liquid provided for the animal's consumption and, if necessary, actuates the flow control device(s) (e.g., valves) accordingly.

In one embodiment, the quantity of liquid consumed by an animal during a dispensational period (e.g., twenty-four hours, forty-eight hours, etc.) is limited. In this scenario, the animal's access to the liquid source is terminated (e.g., the flow control device(s) close the liquid pathway) upon exceeding the predetermined allowed liquid quantity.

In another embodiment, the present invention limits the quantity of liquid available for the animal's consumption during individual drinking events, as well as the required time lapse between consecutive drinking events. In such a system, the flow control device(s) close the liquid pathway in the event that the animal continuously consumes liquid and said consumed quantity of liquid exceeds a preset or predetermined per event limit. Thereafter, the flow control device(s) shall remain closed until a predetermined time period (e.g., one hour, thirty minutes, etc.) elapses. Upon expiration of the time period, the flow control device(s) reopen the liquid pathway, and the animal may again consume the liquid.

In one embodiment of the present invention, an automatic air purge is envisioned. Automatic control of a drinking port is included to allow air to be automatically purged from the liquid pathways until liquid is sensed at the discharge of the drinking port. In the automatic purge embodiment, the drinking port may be controlled as discussed herein for a flow control device, however, an animal may also manually activate such drinking port. In this embodiment, water sensors located in the vicinity of the drinking port may be incorporated to indicate that all air has been completely purged. In an alternate embodiment, a second flow measurement device is located in the drinking assembly liquid pathway. In either embodiment, the water flow or flow measurement data is transmitted to the control unit wherein the automatically controlled drinking port terminates water flow when all air is purged. However, embodiments other than those discussed herein for detecting air purge completion may be substituted without departing from the scope of the present invention.

The user receives and inputs data and commands for the process via one of the available user interfaces. In some embodiments of the present invention, the user interface contains alarm indicators and a totalizer display to indicate status, alarms, and totalized liquid consumption for each animal to the system user. Such alarms may include, but are not limited to, per event consumption alarms, per dispensational period consumption alarms, system disabled alarms, flow control device malfunction alarms, control unit malfunction alarms, communication failure alarms, measured flow out-of-range alarms, and alarms for disconnection of the watering apparatus from the drinking assembly and/or liquid source. In some embodiments, the totalizer display is a light emitting diode ("LED") or liquid crystal display ("LCD") that displays the amount of liquid consumed by each animal in a given period to a viewer.

The watering apparatus may further include one or more interlock sensors and associated interlock mating devices that indicate to the user whether the drinking assembly is attached to the watering apparatus. Preferably, the interlock sensor(s) would be magnetic sensors designed to mate with a corresponding magnetic plate, but other embodiments are envisioned such as mechanically activated switching contacts or infrared receivers and transmitters.

If the drinking assembly becomes detached from the watering apparatus, the respective indicator may cease illumination on the user interface. Indication of detachment of the drinking assembly from the watering apparatus and, therefore, the liquid source, may indicate the presence of a liquid leak. Consequently, such an indication can alarm the user of the leak detection to allow remedial actions to be performed. Alternatively, leak detection sensors may be employed in a variety of locations (e.g., at the watering apparatus inlets or outlets, at the location of the drinking assembly, at the specimen holding area, etc.) to detect such an event. In yet another embodiment, high or low liquid flow may be monitored and alarmed to indicate a block in the liquid pathway or a liquid leak, respectively.

A networked watering system for distributing water or other liquids to one or more animals is provided in another embodiment of the present invention. In this embodiment of the present invention, several watering apparatuses are networked to each other, to a user workstation, and to a central control unit. One watering apparatus is provided for each drinking assembly, which may be contained in a specimen cage such as a vivarium or terrarium, and a user may accurately quantify and control each watering apparatus either locally from the respective local user interface or remotely from a central monitoring station. Each individual watering apparatus performs as described herein. However, the networking of each watering apparatus to one or more user workstations and to one or more central control units via one or more communication buses allows bi-directional communication to occur between all networked components. Such bi-directional communication enhances the safety and ease with which watering apparatuses may be monitored and controlled, allowing one or more watering apparatuses to be monitored and controlled quickly, safely, and easily by a single remote user.

In some embodiments of the present invention, the provided network comprises an open protocol such as BACnet™, LonWorks®, or the like. Such open protocols maximize the possibility and ease with which the network of the present invention may be interfaced to other existing or future networks. This interface allows data and control functions to be shared between the interfaced networks, thereby providing a more global method of using the present invention at a lower initial cost. For example, the network of a networked watering system of the present invention may be interfaced to a new or existing building management system ("BMS") network to allow the operator workstations or other user interfaces available on the BMS to access and/or control the data and devices available in the networked watering system. Such access and control may be performed without the addition of operator workstations or other user interfaces specific to the networked watering system.

In some embodiments, a modem or Internet interface may be a component of the networked watering system. A modem would allow a user that is remote from both the user workstations and local watering apparatus panels to connect to the watering system by placing a telephone call with a personal computer to the networked watering system via the modem. Upon a successful connection, a user may perform all monitoring and control of the watering system as if the user were seated at a user workstation.

Internet interfaces such as cable modems, digital subscriber line ("DSL") modems, wireless routers, or Ethernet cables also allow a user that is remote from both the user workstations and watering apparatuses to connect to the watering system by accessing a web site pre-programmed to access the networked watering system. Upon successful connection to the watering system via the web site, a user may perform all monitoring and control as if the user were seated at a user workstation.

A centralized, non-networked watering system for distributing water or other liquids to several animals simultaneously is provided in another aspect of the present invention. In this embodiment, the watering apparatus contains one main user interface panel connected to several non-intelligent local panels. The main user interface panel contains a control unit hardwired to a user interface and individual totalizer displays (e.g., one totalizer display for each non-intelligent local panel).

In one embodiment, each non-intelligent local panel contains at least one flow control device and at least one flow measurement device that are hardwired to a control unit located in the main user interface panel. Further, each non-intelligent local panel is coupled to a liquid source and a drinking assembly via couplings such as a quick disconnect fittings or quick connect couplings. The control unit executes a process that actuates the flow control device(s) and receives data from the flow measurement device(s) and/or totalizer(s). Similar to the process described above for individual watering apparatuses, the process uses the received data to quantify and control the liquid consumption of each animal while simultaneously displaying the consumption and alarms to a user via the main user interface panel.

Each non-intelligent local panel may also include one or more interlock sensors that are also wired to the control unit in the main user interface panel. Such interlock sensors are compatible with interlock mating devices and upon connection to same, a signal is sent to the main user interface panel to indicate that the drinking assembly is coupled to its respective non-intelligent local panel. If one of the drinking assemblies becomes detached from its respective non-intelligent local panel, an indicator will cease illumination on the face of the main user interface panel.

In an enhanced version of the previously discussed embodiment, multiple main user interface panels are networked to each other and, optionally, to a user workstation or central control unit. In this embodiment, any data present at any main interface panel or non-intelligent local panel may be accessed and/or controlled from a user workstation, central control unit, Internet website, dial in from a remote computer over standard telephone lines, etc. via communication of such data via the bi-directional communication bus.

Alternatively, in yet another embodiment, the non-intelligent local panel is replaced with an intelligent local panel having its own local control unit while still reporting data to a remote main user interface panel. In this embodiment, a communication bus networks one or more control units in the main user interface panel to each of the intelligent local panels and information is transmitted therebetween via the communication bus. In this embodiment, networking of the panels eliminates the need to hardwire the flow measurement device(s), flow control device(s), interlock sensor(s), and any other devices present in the non-intelligent local panel to the main interface panel. However, additional control units are required since each intelligent local panel must be equipped with the ability to send and receive data from the communication bus.

In still another embodiment, a networked watering apparatus is provided without a local or remote user interface panel. In this scenario, the networked watering apparatus is controlled and accessed via a user workstation or central control unit only. However, such user workstation and central control unit may be resident on either or both of the networked watering system(s) or a third-party system interfaced to the networked watering system(s) (e.g., a BMS).

One aspect of the present invention includes the ability to trend each individual animal's instantaneous liquid consumption. Such trending may be performed via a variety of methods including, but not limited to: locally at the control unit, remotely at the main user interface panel's control unit, remotely at a networked central control unit, remotely at one or more user workstation(s), and remotely at the user workstation and/or central control unit of a system interfaced to the watering apparatus of the present invention. This trended data may be sampled at intervals selected by a user (e.g., every five minutes, every fifteen minutes, etc.) and may be saved to the memory of a control unit, central control unit, or user workstation. Such trend data may also be periodically printed to create a hard copy of trend data. Furthermore, this trend data may be exported to popular, commonly available software packages (e.g., Microsoft® Excel®) capable of tabulating and graphing such data to facilitate statistical or other analysis of said data.

Another aspect of the present invention includes the ability to schedule varying programmable parameters of the watering apparatus in advance. Such programmable parameters may include, but are not limited to, dispensational period and per event quantity limitations. Using this feature, a watering apparatus user may schedule varying liquid quantity limits for each animal and for each day or hour of a larger time cycle (e.g., one month). This feature provides more flexibility for the user by allowing differing consumption limits to be determined and programmed in advance without instantaneous manipulation of the system by the user.

Referring first to FIG. 1, depicted is watering apparatus 100 in accordance with one embodiment of the present invention. In this embodiment, watering apparatus 100 includes, inter alia, enclosure 128, user interface 120, inlet coupling 122, outlet coupling 124, and interlock sensor 126.

In one embodiment of the present invention, user interface 120 includes totalizer display 106, system status indicator 108, enable and reset buttons 110 and 112, respectively, interlock status indicator 114, alarm status indicator 116, and air purge button 118. User interface 120 allows a user to provide input to and receive output from watering apparatus 100 as described in greater detail below with respect to FIG. 2.

In many embodiments of the present invention, enclosure 128 is a National Electrical Manufacturers Association ("NEMA") 4-rated panel-style enclosure rated for wet environments or the like. Furthermore, enclosure 128 is provided with ground fault interruption ("GFI") protection to prevent system users from experiencing electrical shocks or death.

Figure 2:
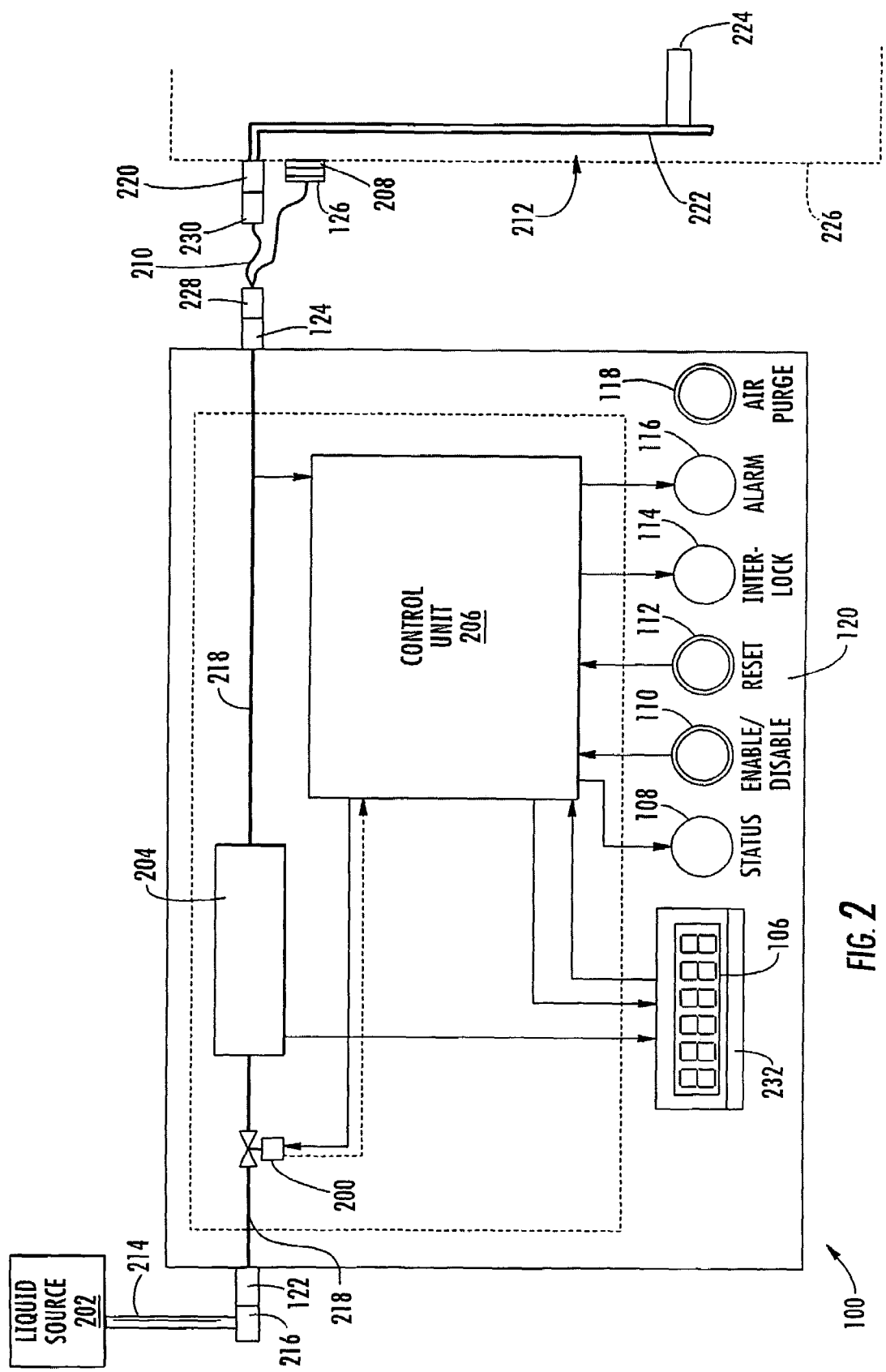
FIG. 2 depicts a cutaway, front view of the watering apparatus shown in FIG. 1 in accordance with an embodiment of the present invention including a schematic interconnection of the internal and external components of the watering apparatus, as well as interlock of the watering apparatus with an independent, external drinking assembly.

Prior to use of watering apparatus 100, a user connects it to a liquid source such as liquid source 202 (FIG. 2) and a drinking assembly (e.g., a water drinking line with nozzle, a feeding bottle, etc.) such as drinking assembly 212 (FIG. 2). The liquid source is detachably connected to watering apparatus 100 via inlet coupling 122. After attachment, a liquid (e.g., water, nutrient-fortified water, juice, etc.) is controllably flowed through watering apparatus 100 from the liquid source through inlet coupling 122 to outlet coupling 124, the latter being detachably connected to a drinking assembly such as drinking assembly 212 (FIG. 2). Interlock sensor 126 is also detachably connected to the drinking assembly and provides status indication to watering apparatus 100. Interlock sensor status allows watering apparatus 100 to prevent spillage upon a determination that a drinking assembly is not attached to outlet coupling 124.

Turning now to FIG. 2, a cutaway, front view of watering apparatus 100 in accordance with the embodiment depicted in FIG. 1 is illustrated including, inter alia, user interface 120, inlet coupling 122, outlet coupling 124, interlock sensor 126, flow control device 200, flow measurement device 204, and control unit 206.

Figure 3A:
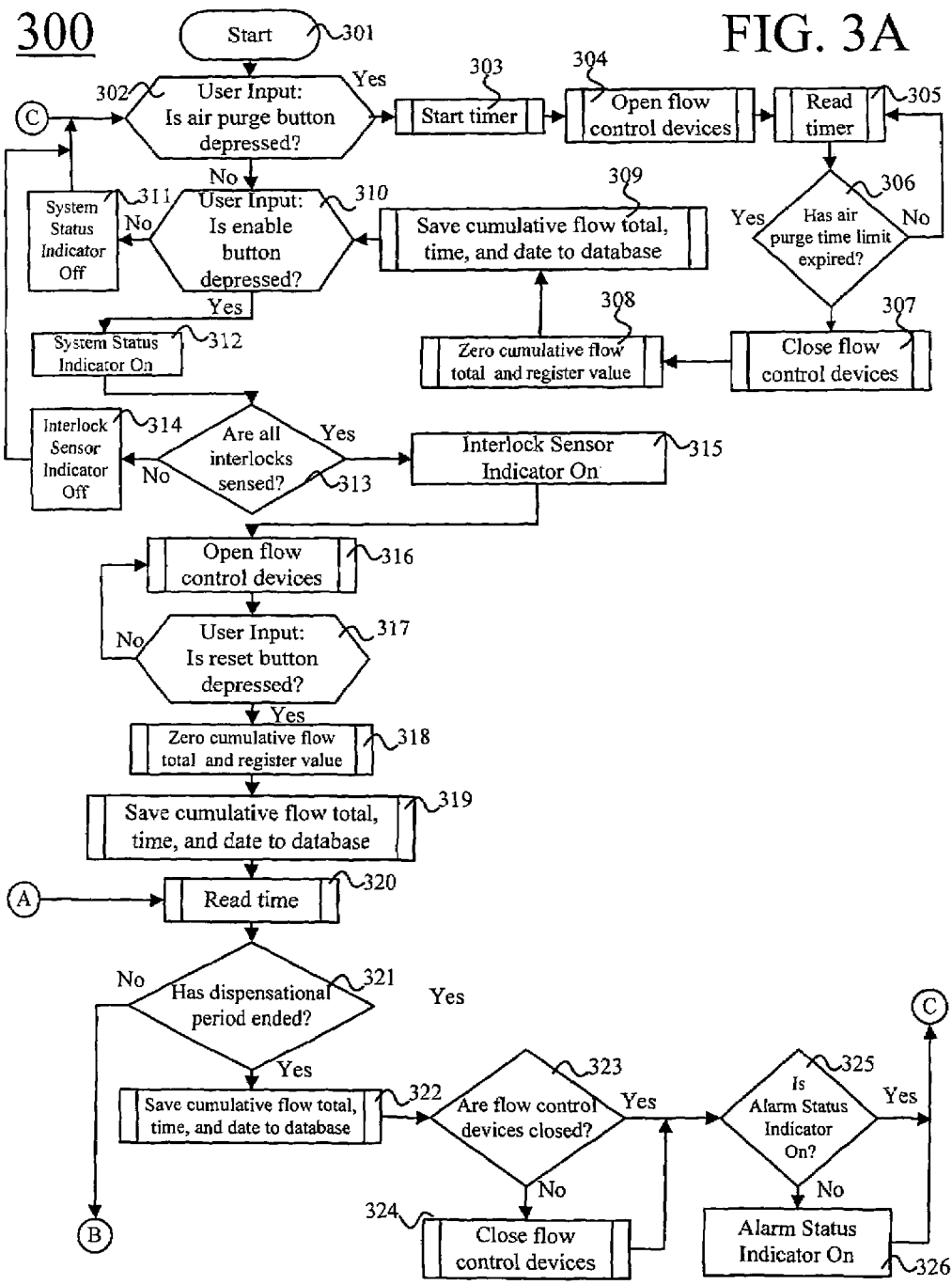
FIGS. 3A-3C depict a flowchart of the steps in a process for monitoring, quantifying, and controlling liquid flow in accordance with an embodiment of the present invention.
Figure 3B:
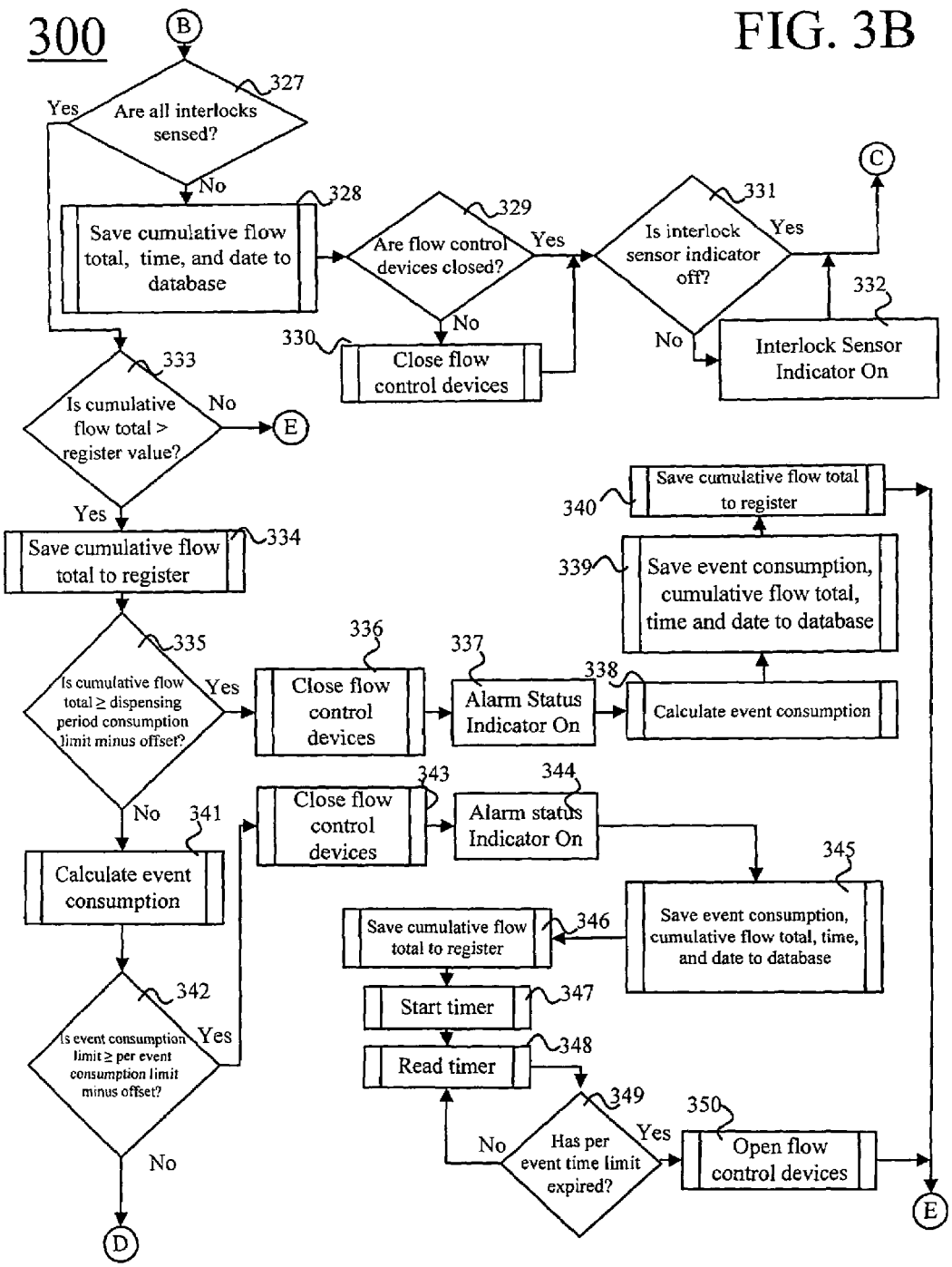
Figure 3C:
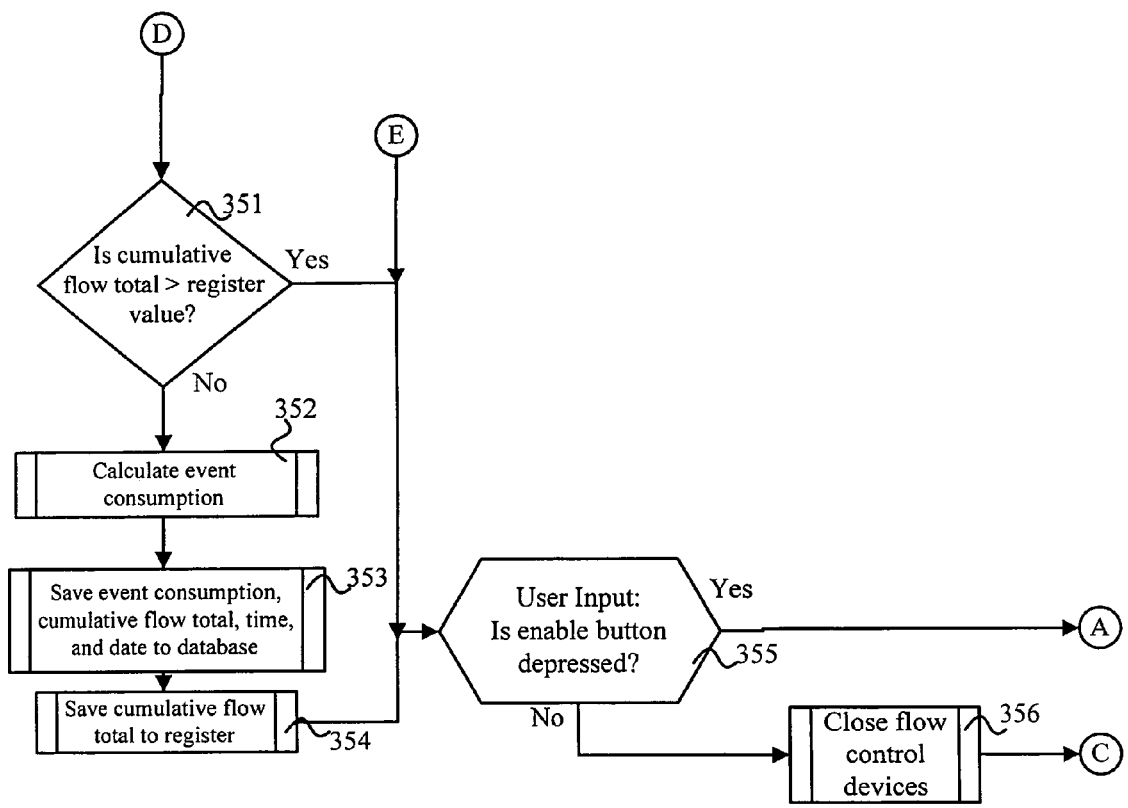

In an embodiment of the present invention, control unit 206 performs the monitoring and control associated with watering apparatus 100 based upon execution of a process such as process 300 (FIGS. 3A, 3B and 3C). In some embodiments, such processes are performed by processors and electrical or electronic components under the control of computer-readable and computer-executable instructions. The computer-readable and computer-executable instructions reside, for example, in data storage features, memory, registers, and other components of a computer system, microprocessor, control unit, or the like.

Figure 8:
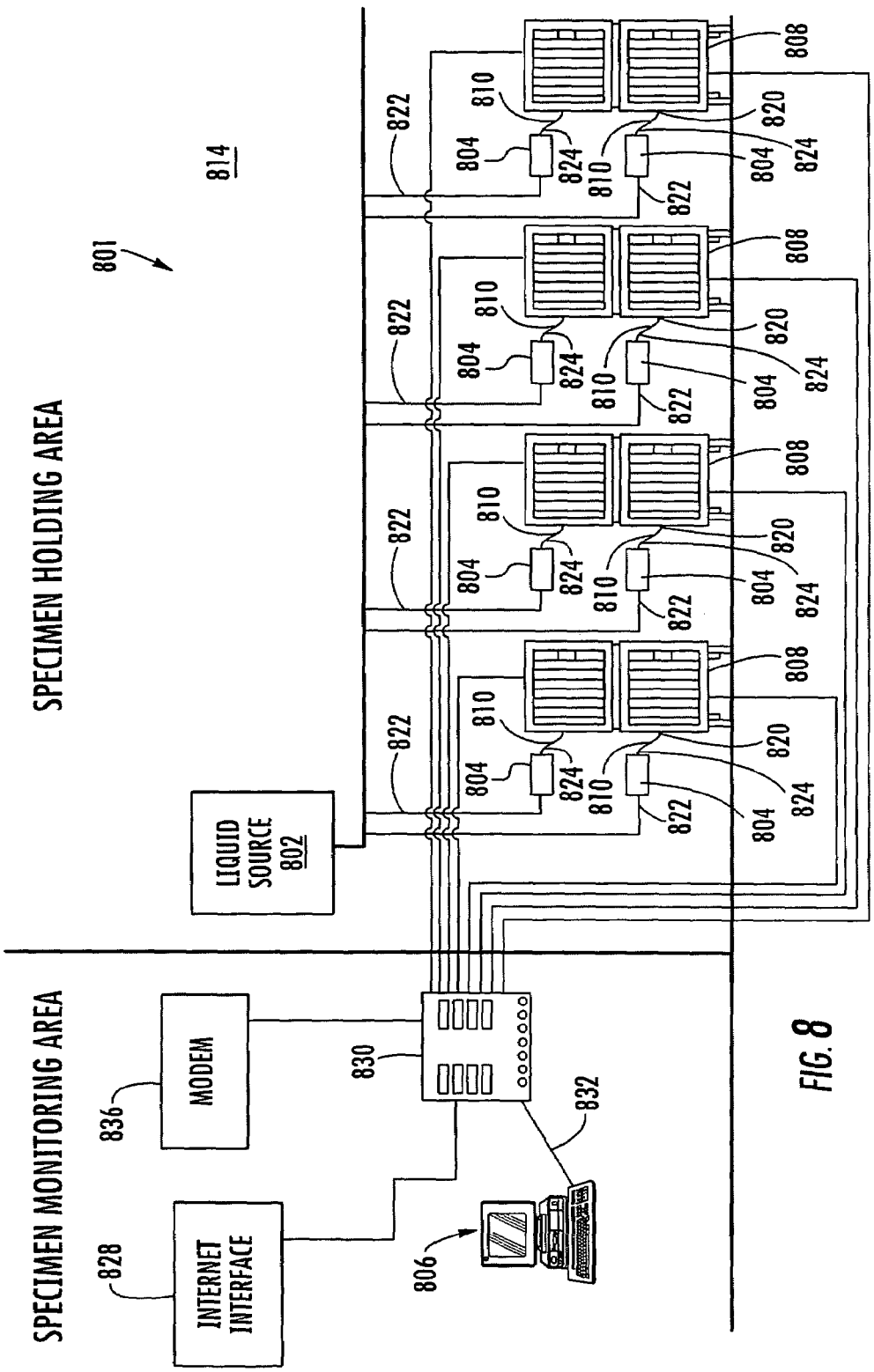
FIG. 8 depicts a networked watering system in accordance with an embodiment of the present invention including, inter alia, a user workstation, main user interface panel, multiple non-intelligent local panels, an Internet interface, and a modem.

Preferably, the process is an algorithm programmed based upon a user's requirements and downloaded to control unit 206 or a portion thereof. However, other methods of loading control unit 206 (e.g., burning or programming an interchangeable EPROM, re-programming an EEPROM, programming a microprocessor, etc.) may be incorporated without departing from the scope of the present invention. Thereafter, parameter changes, calibration values, and the like may be implemented via re-downloading or re-burning control unit 206, or a portion thereof, with a revised process, entering the data via an independent user interface such as independent user interface 902 (FIG. 9), or entering the data via a networked computer located in a user workstation such as user workstation 406 (FIG. 4) or 806 (FIG. 8).

Preferably, the process executed by control unit 206 receives input data from devices that are hardwired to control unit 206. More specifically, in the embodiment of the present invention depicted in FIG. 2, control unit 206 receives binary inputs from air purge button 118 and enable and reset buttons 110 and 112, respectively, and interlock sensor 126, as well as analog inputs from totalizer 232 and flow control device 200. For example, a user presses enable button 110 to enable or disable watering apparatus 100, which in turn causes enable button 110 to send a binary input of "1" for enable or a binary input of "0" for disable to control unit 206. Or, alternatively, watering apparatus 100 may be wired or programmed such that a binary input of "1" received from enable button 110 equates to disable and a binary input of "0" equates to enable. Reset and air purge button, 112 and 118, respectively, are programmed and wired to operate in a similar fashion.

Interlock sensor 126 also transmits a binary signal of "1" or "0" to indicate whether a drinking assembly, such as drinking assembly 212, is interlocked to watering apparatus 100. Interlock sensor 126 may be any one of a variety of devices without departing from the scope of the present invention. For example, in one embodiment, interlock sensor 126 is a magnetic sensor designed to mate with a magnetic plate, which is preferably affixed at or near the inlet of the drinking assembly. The inclusion of an interlock sensor 126 such as a magnetic interlock sensor allows watering apparatus 100 to be cleaned using a chemical wash or the like without adversely affecting the sensor. Upon manual attachment of interlock sensor 126 to its corresponding interlock mating device 208, a binary input of either "1" or "0" is sent to control unit 206 to indicate that a drinking assembly is interlocked with watering apparatus 100, and, consequently, liquid flow may occur through flow control device 200. Although the embodiment depicted in FIG. 2 depicts an interlock sensor for connections to outlet coupling 124 only, alternate embodiments are envisioned having similar interlocks for connections to inlet coupling 122, or other forms of feedback signals, without departing from the scope of the present invention. In these embodiments, control unit 206 may require positive confirmation of connections at both the inlet and outlet couplings 122 and 124, respectively, prior to allowing flow control device 200 to operate.

A variety of devices may be incorporated in watering apparatus 100 to achieve the purpose and function of interlock sensor 126 without departing from the scope of the present invention. For example, interlock sensor 126 may be an infrared receiver and interlock-mating device 208 may be an infrared transmitter, or vice versa. In this scenario, flow control device 200 shall be enabled whenever interlock sensor 126 aligns with interlock mating device 208 such that an interlock signal is received.

In another embodiment, interlock sensor 126 is a mechanically activated switching contact integral to outlet coupling 124. In this embodiment, the switching contact changes state whenever a liquid carrier, such as outlet liquid carrier 210, is physically attached to outlet coupling 124. For example, embodiments are envisioned in which outlet liquid carrier 210 is inserted into the interior of a cylindrical outlet coupling 124 causing a spring-loaded cylindrical device to change position, thereby mechanically changing the state of the switching contact and changing the input signal transmitted to control unit 206 from "0" to "1", or vice versa. Upon withdrawal of outlet liquid carrier 210 from outlet coupling 124, the spring-loaded cylindrical device returns to its unloaded position, causing the switching contact to return to its non-interlocked state and causing the input signal transmitted to control unit 206 to revert to its pre-programmed, non-interlocked value. In some embodiments, one or more similar interlock sensors may also be incorporated for inlet coupling 122.

If drinking assembly 212 becomes detached from watering apparatus 100, interlock status indicator 114 ceases illumination. Indication of detachment of drinking assembly 212 from watering apparatus 100 and, therefore, liquid source 202, may indicate the presence of a liquid leak. Consequently, such an indication at user interface 120, user workstations 406 (FIG. 4) or 806 (FIG. 8), and/or independent user interface 902 can alarm the user of the leak detection to allow remedial actions to be performed. Alternatively, leak detection sensors may be employed in a variety of locations (e.g., at inlet coupling 122 and/or outlet coupling 124, at drinking assembly 212, at specimen holding area 226, etc.) to detect such an event. In yet another embodiment, high or low liquid flow, as sensed by flow measurement device 204, may be monitored and alarmed to indicate a block in liquid pathway 218 or a liquid leak, respectively.

In contrast to the "0" or "1" binary signals received from the aforementioned devices, totalizer 232, in the embodiment of the present invention depicted in FIG. 2, transmits analog signals to control unit 206. These analog signals are generated by totalizer 232 based upon information received from flow measurement device 204. In one embodiment, flow measurement device 204 includes an integral paddle wheel capable of sensing the liquid flow rate with an accuracy of plus or minus one and a half percent. The electronics of flow measurement device 204 then convert the data sensed by the paddle wheel to electrical pulses that vary in frequency in correlation to the variance in the flow rate. These frequency signals are sensed by control unit 206 or totalizer 232 and converted to liquid consumption data. However, alternate embodiments are envisioned having flow measurement devices having varying types of sensing mechanisms and output signals. Virtually any method of sensing flow may be substituted without departing from the scope of the present invention. The electric pulses generated by flow measurement device 204 are transmitted to totalizer 232, which converts them into real time flow and total flow data.

In the present embodiment, the total flow data, as calculated by totalizer 232, is transmitted to control unit 206 via a scaled 4-20 milliampere ("mA") signal, or, alternatively, any signal compatible with control unit 206 (e.g., a zero to ten volt direct current signal, a zero to twenty mA signal, a pulsed binary contact, etc.). In addition to sending totalized data to control unit 206, totalizer 232 also displays the totalized result on totalizer display 106, such as an integral LED or LCD, mounted through the face of watering apparatus 100 such that totalizer display 106 forms a part of user interface 120. At the end of a watering period, as discussed in greater detail below with respect to FIGS. 3A-3C, control unit 206 resets totalizer 232 and totalizer display 106 to zero.

Figure 9:
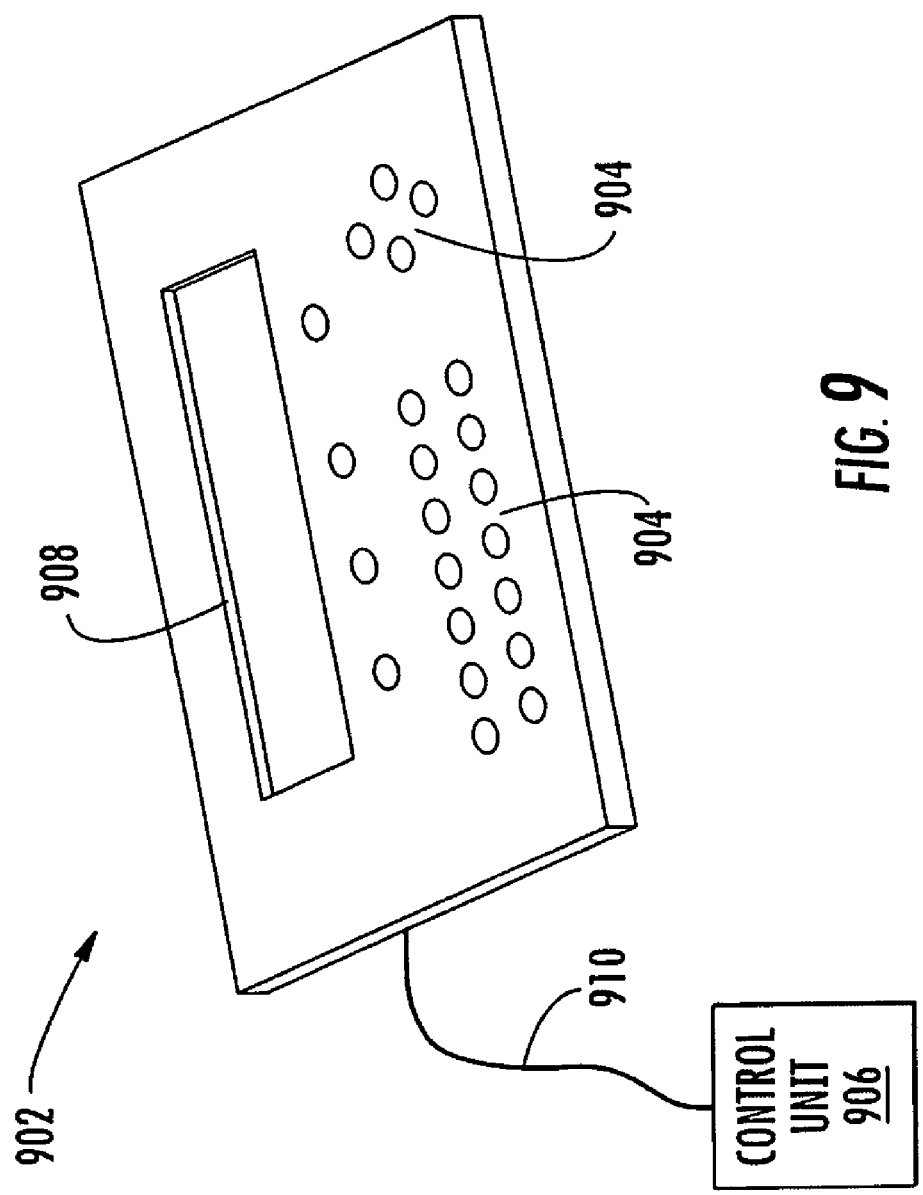
FIG. 9 depicts an independent user interface in accordance with multiple embodiments of the present invention and including a cable for connection of the independent user interface to a control unit.

In an alternate embodiment of the present invention, totalizer 232 is eliminated. In this embodiment, flow measurement device 204 transmits data directly to control unit 206, which totalizes the data and, optionally, transmits the totalized result to a standalone display (i.e., a display that is not integral to a totalizer or totalizing device) via analog or binary signals generated by control unit 206. In this embodiment, the totalized data may be reset to zero as a function, or software interlock, of a process programmed into control unit 206 rather than via a hardwired input. Alternatively, control unit 206 may transmit the totalized data to standalone user interface 902 (FIG. 9) which may also be mounted in the face of enclosure 128 and connected to control unit 206 via a cable such as cable 920 (FIG. 9).

The process executed by control unit 206 receives the analog and binary input data discussed above and uses such data to generate and transmit output signals to actuate flow control device 200, to reset totalizer 232, and to illuminate system status indicator 108, interlock status indicator 114, and alarm status indicator 116 as discussed in greater detail below with respect to FIGS. 3A-3C. Flow control device 200 may be virtually any flow control device capable of receiving an analog or binary signal from control unit 206. For example, flow control device 200 may be a modulating or two-position valve equipped with an automatically controlled actuator. In preferred embodiments, the actuator of flow control device 200 is equipped with a binary or analog feedback signal that transmits actual valve position data to control unit 206. Such feedback data may be compared to the command signal being transmitted to flow control device 200 to determine if a valve failure has occurred. For example, if flow control device 200 has been commanded to fifty percent open and, after a predetermined time period that allows the valve to modulate, the feedback signal indicates that flow control device 200 is twenty percent open, it is likely that flow control device 200 has jammed or failed. In such a scenario, an alarm indicator 116 shall be illuminated and alarms may be optionally transmitted to user workstations 406 (FIG. 4) or 806 (FIG. 8) and independent user interface 902

Prior to operation, a user must connect watering apparatus 100 to a liquid source such as liquid source 202 and a drinking assembly such as drinking assembly 212. Liquid source 202 typically includes a hose or similar device, such as inlet liquid carrier 214, attached at a first end to liquid source 202 and attached either removably or permanently at a second end to a liquid source coupling 216, such as a quick disconnect fitting or a quick connect coupling. Inlet coupling 122 is designed for compatibility with intended liquid source couplings 216 to allow liquid source coupling 216 to be simply "plugged in" to inlet coupling 122. Liquid then flows from liquid source 202 to outlet coupling 124 through inlet liquid carrier 214, liquid source coupling 216, inlet coupling 122, and watering apparatus liquid pathway 218, the latter of which contains flow control device 200 and flow measurement device 204.

Outlet coupling 124 is designed for attachment to a drinking assembly such as drinking assembly 212. In the embodiment of the present invention depicted in FIG. 2, drinking assembly 212 includes drinking assembly coupling 220, drinking assembly liquid pathway 222, and drinking port 224. In some embodiments, the drinking assembly is an integral part of, or is coupled to, an animal holding cage such as a vivarium or terrarium.

Outlet liquid carrier 210, having outlet liquid carrier inlet and outlet couplings 228 and 230, respectively, at each end, connects watering apparatus liquid pathway 218 to drinking assembly liquid pathway 222 via connection of outlet liquid carrier inlet coupling 228 to outlet coupling 124 and connection of outlet liquid carrier outlet coupling 230 to drinking assembly coupling 220. Such a connection allows liquid flowing from liquid source 202 to flow though watering apparatus liquid pathway 218 and drinking assembly liquid pathway 222 to drinking port 224 under the regulation of flow control device 200.

In this embodiment, liquid flow may be initiated by pressing drinking port 224 from a closed position to an open position. Also, interlock sensor 126 is manually coupled to interlock mating device 208 upon successful connection of outlet liquid carrier 210 to watering apparatus 100 and drinking assembly 212 to toggle the interlock status binary input of control unit 206, thereby notifying control unit 206 and its associated process that drinking assembly 212 is properly coupled to watering apparatus 100. Such a notification allows liquid flow to occur if all other conditions are met and causes control unit 206 to illuminate interlock status indicator 114.

After connection of watering apparatus 100 to both a liquid source and a drinking assembly, watering apparatus 100 may be enabled. When enable button 110 is in the disabled position, flow control device 200 remains closed preventing liquid flow from liquid source 202. Prior to initial enablement, the user must press drinking port 224 to the open position and depress air purge button 118. Upon depression of air purge button 118, flow control device 200 opens for a predetermined time period such that all air is removed from inlet liquid carrier 214, liquid source coupling 216, inlet coupling 122, watering apparatus liquid pathway 218 including flow control device 200 and flow measurement device 204, outlet coupling 124, outlet liquid carrier inlet coupling 228, outlet liquid carrier 210, outlet liquid carrier outlet coupling 230, drinking assembly coupling 220, and drinking assembly liquid pathway 222. As air is purged from the aforementioned pathway, this pathway fills with liquid derived from liquid source 202. Flow control device 200 closes after the preset time period has expired and all of the air has been removed from the pathway. The user must then press drinking port 224 to the closed position and depress enable button 110. When a user depresses enable button 110, thereby changing it to the enabled position, and interlock sensor 126 is coupled to interlock mating device 208, control unit 206 opens flow control device 200 and illuminates system status indicator 108.

Although the embodiment of the present invention depicted in FIG. 2 requires a manual air purge, varying embodiments are envisioned having automatic air purge. In these embodiments, automatic control of drinking port 224 is included allowing air to be purged until liquid is sensed at the discharge of drinking port 224. In the automatic purge embodiment, drinking port 224 is controlled as discussed herein for flow control device 200. Such control may be binary or analog and feedback signals may optionally be included to determine failure of drinking port 224. In this embodiment, water sensors located in the vicinity of drinking port 224 may be incorporated to indicate that the air has been purged. Such sensors transmit water detection data to control unit 206 via analog or binary signals as discussed herein. In an alternate embodiment, a second flow measurement device is located in drinking assembly liquid pathway 222. This device determines whether the air has been purged based upon the instantaneous flow sensed in drinking assembly liquid pathway 222. Similar to the water detection sensors, the instantaneous flow data is transmitted to control unit 206 via analog or binary signals. However, embodiments other than those discussed herein for detecting air purge completion may be substituted without departing from the scope of the present invention.

After either a manual or automatic air purge, drinking port 224 returns to its closed position after the liquid reaches drinking port 224. After an automatic purge, control unit 206 is automatically notified that the liquid passing through flow measurement device 204 was not consumed by an animal, but was simply used to fill liquid and drinking assembly pathways 218 and 222, respectively. Alternatively, after a manual purge, the user must manually send notification to control unit 206 by pressing reset button 112. This notification ensures that the liquid used to fill the liquid pathways is not incorrectly included as part of the respective animal's liquid consumption.

When the animal in specimen holding area 226 opens drinking port 224, liquid from liquid source 202 flows to drinking port 224 via the aforementioned pathway and the quantity of liquid consumed by the animal is accurately quantified by watering apparatus 100 as discussed in greater detail below with respect to FIGS. 3A-3C. Furthermore, the quantity of liquid consumed during one drinking event or over a predetermined time period (e.g., twenty-four hours), as well as the elapsed time between drinking events, may also be controlled or limited by watering apparatus 100.

Referring now to FIG. 3A, illustrated is a flow diagram of one embodiment of a process for controlling liquid flow and quantifying an animal's liquid consumption in accordance with embodiments of the invention. In one embodiment, the values for control parameters such as dispensational period consumption limit, per event consumption limit, consumption limit offset, purge time limit, and per event time limit are entered into control unit 206 prior to operation of watering apparatus 100 using one of a variety of methods including, but not limited to, downloading the parameters to control unit 206 or a portion thereof, entering the data via independent user interface 902 (FIG. 9), and entering the data via a standalone, networked, or interfaced user workstation such as user workstation 406 (FIG. 4) or user workstation 806 (FIG. 8).

In an embodiment incorporating process 300 as depicted in FIGS. 3A-3C, the dispensational period consumption limit is the maximum quantity of liquid allowed to be consumed by a specific animal during an individual dispensational period. Similarly, the per-event time limit is the maximum quantity of liquid that may be consumed by a specific animal during one drinking event. The per event time limit is the minimum amount of time that must elapse between consecutive drinking events (i.e., the minimum amount of time that must elapse after a drinking event but before the animal is allowed to drink again). The air purge time limit is the amount of time that the flow control device remains open to remove all air from the system. If the user does not enter these values, control unit 206 will use default values preprogrammed in process 300 by the manufacturer.

Referring now to FIG. 3A, process 300 begins at 301. For example, at 301 a user may attach watering apparatus 100 to liquid source 202 and drinking assembly 212 as described above with respect to FIG. 2. At 301, all flow control device(s) are closed and the enable point such as enable button 110 is in the disabled position. At 302, process 300 queries the air purge point and, if it is in a disabled position, process 300 proceeds to 310. However, if, at 302, the air purge point is in an enabled position, process 300 proceeds to 303. At 303, process 300 begins purging the air from the system by activating an air purge timer. Immediately after the timer is activated at 303, all flow control devices such as flow control device 200 open at 304. Process 300 then proceeds to 305. At 305, the timer is read and process 300 proceeds to 306. At 306, if the air purge limit has not expired, process 300 returns to 305. However, if the per event time limit has expired, process 300 proceeds to 307, whereupon the flow control device(s) are closed and process 300 proceeds to 308. At 308, the cumulative flow total and register value are set to zero and process 300 proceeds to 309. At 309, the cumulative flow total, time, and date are saved to the database. Process 300 then proceeds to 310.

At 310, process 300 queries the enable point and, if it is in an enabled position, process 300 proceeds to 312. However, if, at 310, the enable point is in a disabled position, process 300 proceeds to 311. At 311, a system status indicator such as system status indicator 108 is turned off and process 300 returns to 302.

At 312, the system status indicator indicates that the system is enabled and process 300 proceeds to 313. At 313, if the interlock sensor(s) sense that one or more of a liquid source and a drinking assembly are connected to the watering apparatus, process 300 proceeds to 315. For example, in the embodiment depicted in FIGS. 1 and 2, attachment of watering apparatus 100 to drinking assembly 212 is sensed whenever interlock sensor 126 is connected to interlock mating device 208 and confirmation of attachment of watering apparatus 100 to liquid source 202 is not required. If, at 313, the connection statuses required for the specific embodiment are not sensed, process 300 proceeds to 314. At 314, an interlock status indicator such as interlock status indicator 114 is turned off and process 300 returns to 302.

At 315, the interlock status indicator indicates that interlock has been sensed and process 300 proceeds to 316. At 316, all flow control devices such as flow control device 200 opens and process 300 proceeds to 317. At 317, the control unit queries the reset point. If the reset point, such as reset button 112, is disabled, process 300 returns to 316. However, if, at 317, the reset point is enabled indicating that air has been either manually or automatically purged from the liquid pathways and the user wishes to begin monitoring the animal's water consumption, process 300 proceeds to 318. At 318, the cumulative flow total and register value are set to zero and process 300 proceeds to 319. At 319, the cumulative flow total, time, and date are saved to the database. Process 300 then proceeds to 320. At 320, the current time is read and process 300 proceeds to 321. At 321, if the dispensational period has not ended, process 300 proceeds to 327 (FIG. 3B).

Alternatively, if, at 321, the dispensational period has ended, process 300 proceeds to 322. At 322, the cumulative flow total, time, and date are saved to the database and process 300 proceeds to 323. At 323, if the flow control device(s) such as flow control device 200 and any automatic drinking ports 224 are closed, process 300 proceeds to 325. However, if, at 323, the flow control device(s) are open, process 300 proceeds to 324 and closes the flow control device(s) before proceeding to 325. At 325, if an alarm status indicator such as alarm status indicator 116 does not indicate an alarm, process 300 proceeds to 302. However, if, at 325, an alarm status indicator indicates an alarm, process 300 proceeds to 326 and enables the alarm status prior to proceeding to 302.

Referring now to FIG. 3B, depicted is an extension of process 300 depicted in FIG. 3A. FIG. 3B begins at 327, where if the interlock sensor(s) sense that one or more of a liquid source and a drinking assembly are connected to the watering apparatus, process 300 proceeds to 333. If, at 327, the interlock statuses required for the specific embodiment are not sensed, process 300 proceeds to 328. At 328, the cumulative flow total, time, and date are saved to the database and process 300 proceeds to 329. At 329, if the flow control device(s) such as flow control device 200 and automatic drinking port 224 are closed, process 300 proceeds to 331. However, if, at 329, any of the flow control device(s) are open, process 300 proceeds to 330 and closes the flow control device(s) before proceeding to 331. At 331, if the interlock status indicator such as interlock status indicator 114 indicates the loss of the interlock status, process 300 proceeds to 302. However, if, at 331, the interlock status indicator does not indicate loss of interlock status, process 300 proceeds to 332 and turns on the interlock status indicator prior to proceeding to 302.

At 333, the cumulative flow total is compared to the register value. At 333, if the cumulative flow total is not greater than the register value, process 300 proceeds to 355. However, if the cumulative flow total is greater than the register value, this indicates that the animal has started to drink liquid, and process 300 proceeds to 334. At 334, the cumulative flow total is saved to the register and process 300 proceeds to 335. At 335, process 300 determines whether the consumption limit for the dispensational period has been or is about to be exceeded.

If, at 335, the cumulative flow total is greater than or equal to the dispensational period consumption limit minus the consumption limit offset, process 300 will close flow control device 200 to prevent the animal from drinking any liquid beyond that contained in the liquid pathway downstream of flow control device 200. In addition, process 300 records the quantity of liquid consumed. The offset may be entered by a user, or may be pre-programmed during manufacturing based upon the characteristics of the watering apparatus. Such offset is equal to the quantity of liquid contained downstream of the flow control device and may therefore be dependent on the drinking assembly and outlet liquid carrier coupled to the watering apparatus. In one embodiment, offsets are selected from a menu based upon the length of the outlet liquid carrier and the type of drinking assembly.

At 336, the flow control device(s) close and process 300 proceeds to 337. At 337, the alarm status indicator such as alarm status indicator 116 is activated to indicate that the animal has exceeded its dispensational period consumption limit minus the consumption limit offset, and process 300 proceeds to 338. At 338, process 300 calculates the event consumption by subtracting the saved cumulative flow total as recorded at the end of the previous drinking event from the current cumulative flow total to determine the quantity of liquid consumed by the animal since the last drinking event, and process 300 proceeds to 339. At 339, the event consumption, cumulative flow total, time, and date are saved to the database and process 300 proceeds to 340. At 340, the cumulative flow total is saved to the register, and process 300 proceeds to 355.

Alternatively, if the animal has not consumed a quantity of liquid in excess of the dispensational period consumption limit minus the consumption limit offset, process 300 proceeds from 335 to 341 at which point process 300 calculates the event consumption by subtracting the saved cumulative flow total as recorded at the end of the previous drinking event from the current cumulative flow total. At 342, the quantity of liquid consumed by the animal in the current drinking event is compared to the per event consumption limit minus the consumption limit offset. If the event consumption is greater than or equal to the per event consumption limit minus the consumption limit offset, the per event consumption has been exceeded by the animal, and process 300 proceeds to 343. If, at 342, the animal has not exceeded its per event drinking limit minus the consumption limit offset, process 300 proceeds to 351 (FIG. 3C).

At 343, the flow control device(s) close and process 300 proceeds to 344. At 344, the alarm status indicator such as alarm status indicator 116 is activated to indicate that the animal has exceeded its per event consumption limit minus the consumption limit offset, and process 300 proceeds to 345. At 345, the event consumption, cumulative flow total, time, and date are saved to the database and process 300 proceeds to 346 at which the cumulative flow total is saved to the register. At 347, process 300 prevents the animal from further consumption of the liquid until a minimum time period has expired by activating a per event consumption timer. At 348, the timer is read and process 300 proceeds to 349. At 349, if the per event time limit has not expired, process 300 returns to 348. However, if the per event time limit has expired, process 300 proceeds to 350, whereupon the flow control device(s) are re-opened and process 300 proceeds to 355.

Continuing now to FIG. 3C, depicted is an extension of process 300 depicted in FIGS. 3A and 3B. FIG. 3C begins at 351 at which the cumulative flow total is compared to the register total. If the cumulative flow total is greater than the register total, this indicates that the animal continues to consume liquid, and process 300 proceeds to 355. In the alternative, if, at 351, the cumulative flow total is not greater than the register total, this indicates that the animal has ceased liquid consumption, and process 300 proceeds to 352. At 352, process 300 calculates the event consumption by subtracting the saved cumulative flow total as recorded at the end of the previous drinking event from the current cumulative flow total to determine the quantity of liquid consumed by the animal since the last drinking event, and process 300 proceeds to 353. At 353, the event consumption, cumulative flow total, time, and date are saved to the database and process 300 proceeds to 354. At 354, the cumulative flow total is saved to the register and process 300 proceeds to 355.

At 355, process 300 queries the enable point, such as enable button 110, to determine whether a user has disabled the watering apparatus. If the watering apparatus is still enabled, process 300 returns to 320 (FIG. 3A). However, if enable button 110 is in a disabled position, process 300 proceeds to 356 at which the flow control device(s) are closed and process 300 returns to 302 (FIG. 3A).

Figure 4:
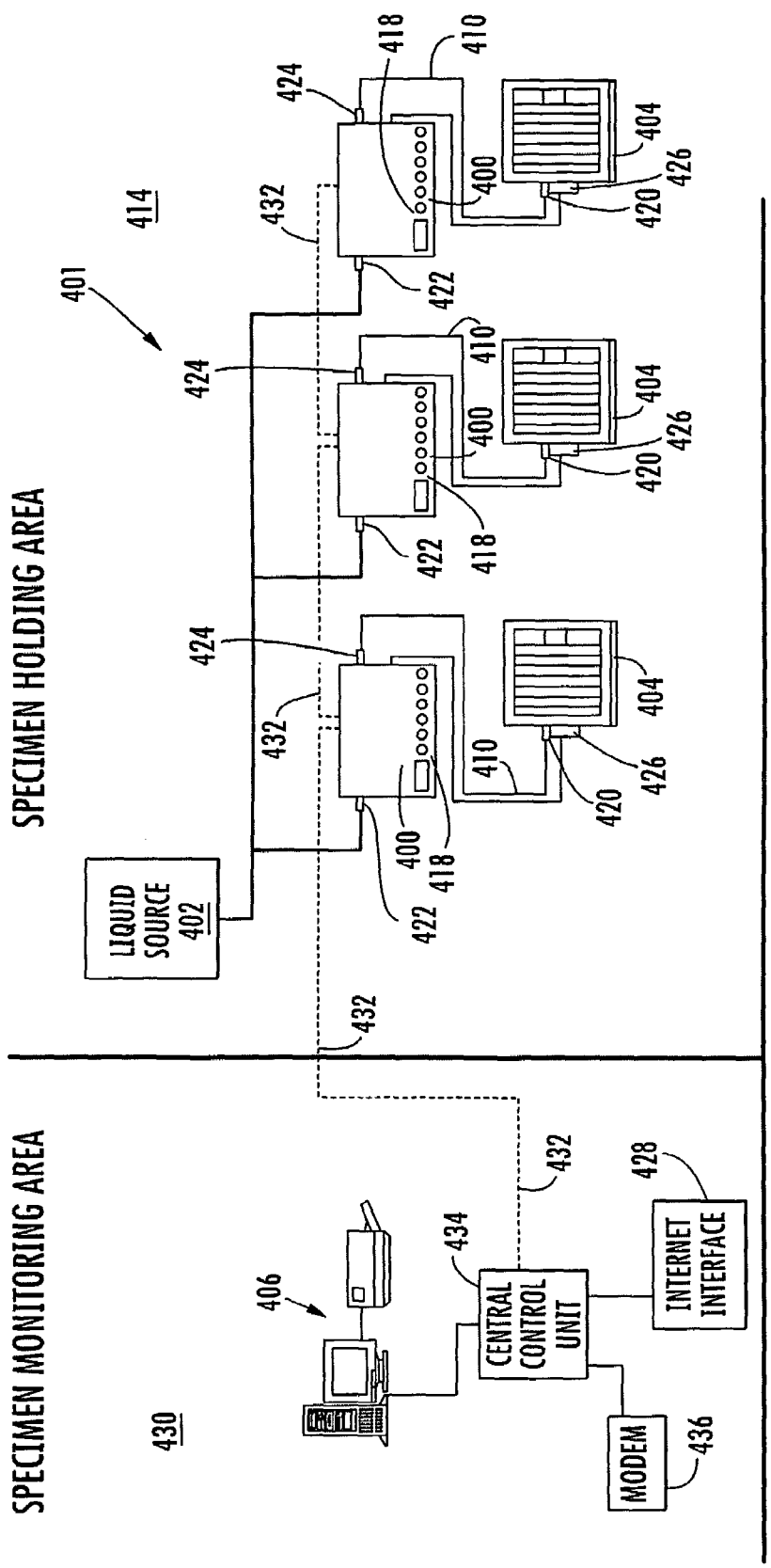
FIG. 4 depicts a networked watering system in accordance with a networked embodiment of the present invention including, inter alia, multiple watering apparatuses, multiple specimen cages, a liquid source, and a remote monitoring station.

Turning next to FIG. 4, depicted is networked watering system 401 including multiple watering apparatuses 400 networked to each other, to user workstation 406 and to central control unit 434. In this embodiment, one watering apparatus 400 is provided for each specimen cage 404 (e.g., a vivarium, terrarium, etc.) and a user may monitor and control each watering apparatus 400 either locally from the respective local user interface 418 or remotely from central monitoring station 430, the latter of which may include one or more of user workstation 406, central control unit 434, modem 436, and internet interface 428.

Each watering apparatus 400 has features and characteristics similar to watering apparatus 100 described in detail herein. In this scenario, each watering apparatus 400 is connected to liquid source 402 which is piped, or otherwise distributed, to individual specimen cages 404 located throughout the specimen holding area 414. Each watering apparatus 400 intercepts the liquid supplied to the respective specimen cage 404 by coupling liquid source 402 to its respective inlet coupling 422. Also, each watering apparatus 400 provides a controlled liquid supply to the respective specimen cage 404 via individual, respective liquid carriers 410 coupled to outlet couplings 424 and cage couplings 420. Individual interlock sensors 426 on each specimen cage 404 are also wired to its respective watering apparatus 400 to provide feedback regarding the connection of specimen cage 404, or its internal drinking assembly, to liquid carrier 410. Through these interconnections, watering apparatuses 400 accurately quantify and control the liquid supplied to specimen cages 404 as described herein with respect to watering apparatus 100.

However, in addition to the features and characteristics of watering apparatus 100, the networking of each watering apparatus 400 to one or more user workstations 406 and to one or more central control units 434 via one or more communication buses 432 allows bi-directional communication to occur between all networked components. Such bi-directional communication enhances the safety and ease with which watering apparatuses 400 may be monitored and controlled.

In this embodiment of the present invention, one or more watering apparatuses 400 may be monitored and controlled quickly, safely, and easily by a single user. This aspect of the present invention is particularly advantageous for use in an environment housing a large quantity of animals and having limited personnel to patrol individual watering apparatuses 400. A single user located at a user workstation 406 may monitor all alarms for all watering apparatuses 400 while simultaneously monitoring each animal's liquid consumption and adjusting or overriding individual parameters for each watering apparatus 400. Such alarms may include, but are not limited to, per event consumption alarms, per dispensational period consumption alarms, system disabled alarms, flow control device malfunction alarms, control unit malfunction alarms, communication failure alarms, measured flow out-of-range alarms, and alarms for disconnection of watering apparatus 400 from liquid source 402, specimen cage 404, or its internal drinking assembly.

Additionally, one or more of the aforementioned alarms may be programmed for automatic disposition. For example, one or more specific alarms may be programmed for automatic printing at any one or more user workstations 406 or central control units 434. Or, alternatively, one or more specific alarms may be programmed for automatic transmission via electronic mail from a user workstation 406 to a device such as a remote personal computer, handheld personal digital assistant ("PDA"), cellular telephone, alphanumeric pager, digital pager, etc. Or, in yet another alternate embodiment, one or more specific alarms may be programmed for transmission via a short haul modem to a non-electronic mail paging system. Many other methods of alarm disposition other than those specifically enumerated herein may be incorporated without departing from the scope of the present invention.

In addition to receiving alarms, users of watering apparatuses 400 may perform all monitoring and control from any user workstation 406 for a specific watering apparatus 400 as if the user were standing at its local user interface 418. For example, a user may override the pre-programmed consumption limits for each individual animal as necessary to achieve the objectives of the experiments. Or, a user may modify the permanent programmed data such as the length of the dispensational periods, the per event time limits, and the per event and dispensational period consumption limits. Users may also override or control watering apparatus 400 devices. For example, users may remotely enable, disable, or reset a watering apparatus 400. In addition, users may override all outputs including, but not limited to, the flow control device. Furthermore, calibration values may also be entered via user workstation 406.

In some embodiments, modem 436 is included. Modem 436 may be coupled to any one of watering apparatus 400, user workstation 406, or central control unit 434. A telephone line is also coupled to modem 436 to connect it to a public telephone system. This connection allows a user that is remote from both the user workstations 406 and watering apparatuses 400 to connect to the latter by placing a telephone call with a personal computer to the networked watering system 401. Upon a successful connection, a user may perform all monitoring and control as if the user were seated at a user workstation 406.

Similarly, embodiments are envisioned that include Internet interfaces 428 (e.g., cable modem, DSL modem, wireless router, Ethernet cable, etc.). Internet interface 428 may be coupled to any one of watering apparatus 400, user workstation 406, or central control unit 434. This connection allows a user that is remote from both the user workstations 406 and watering apparatuses 400 to connect to the latter by accessing a web site programmed to access networked watering system 401. Upon successful connection to the web site, a user may perform all monitoring and control as if the user were seated at a user workstation 406.

In yet another embodiment, networked watering apparatus 401 includes a network having an open protocol such as BACnet™, LonWorks®, or the like. Such open protocols maximize the possibility and ease with which networked watering apparatus 401 may be interfaced to other existing or future networks. This interface allows data and control functions to be shared between the interfaced networks, thereby providing a more global method of using the present invention at a lower initial cost. For example, the network of a networked watering apparatus 401 may be interfaced to a new or existing building management system ("BMS") network to allow the operator workstations or other user interfaces available on the BMS to access and/or control the data and devices available in networked watering system 401. Such access and control may be performed without the addition of operator workstations or other user interfaces specific to networked watering system 401.

Figure 5:
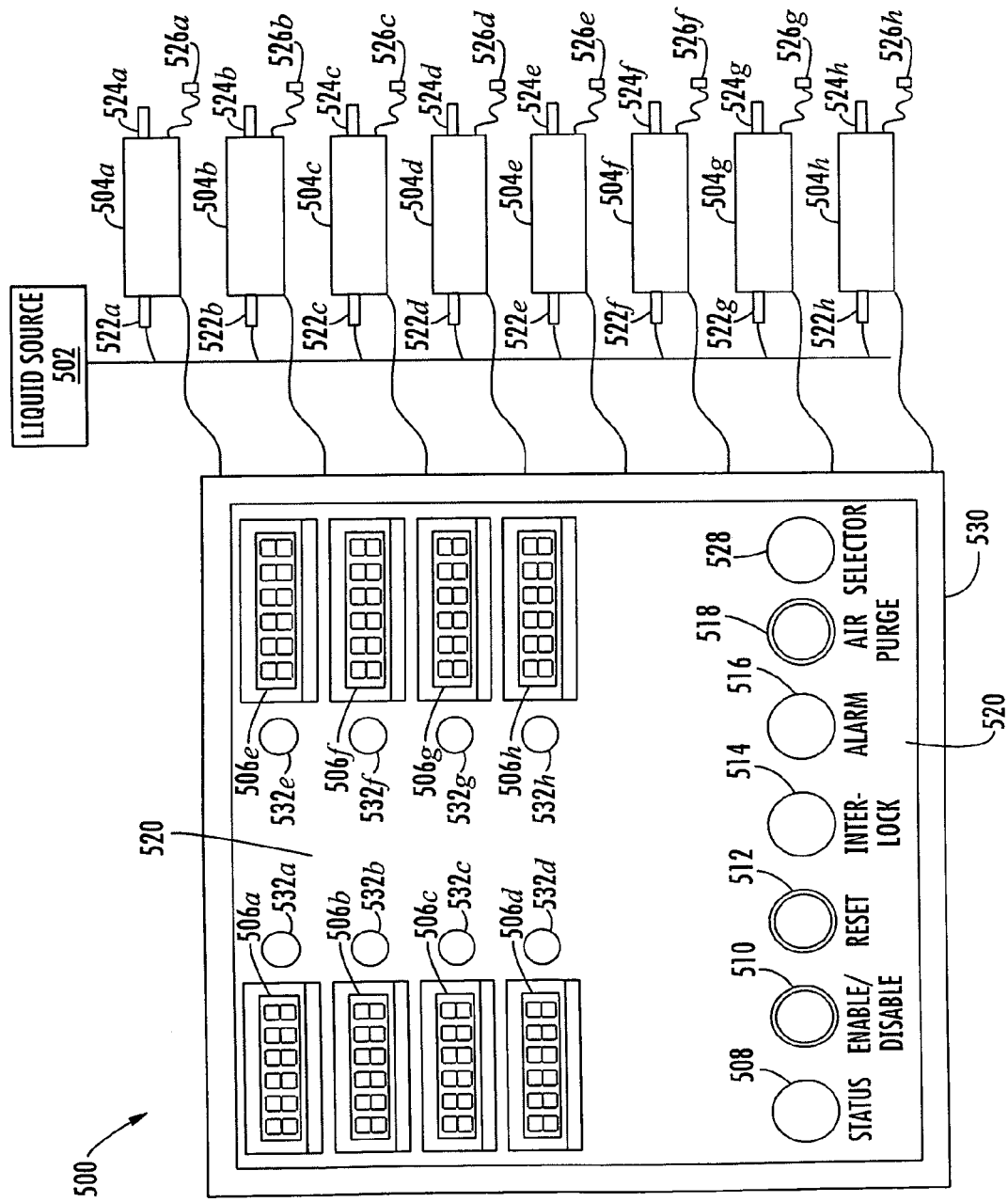
FIG. 5 depicts a main user interface panel coupled to eight non-intelligent local panels in accordance with an embodiment of the present invention.

Referring next to FIG. 5, depicted is watering apparatus 500 including, inter alia, main panel 530, non-intelligent local panels 504a-504h, user interface 520, inlet couplings 522a-522h, outlet couplings 524a-524h, and interlock sensors 526a-526h. In this embodiment, one main user interface panel 530 provides a single user interface capable of entering and receiving data for the monitor and control of multiple drinking assemblies via their respective non-intelligent local panels 504a-504h.

User interface 520 contains totalizer displays 506a-506h, specimen holding area indicators 532a-532h, system status indicator 508, interlock status indicator 514, alarm status indicator 516, air purge button 518, selector button 528, and enable and reset buttons 510 and 512, respectively. User interface 520 allows a user to provide input and receive output from watering apparatus 500 as described in greater detail below with respect to FIGS. 6 and 7.

Watering apparatus 500 has features and characteristics similar to watering apparatus 100 as described in detail herein. In this embodiment of the present invention, liquid source 502 is piped, or otherwise distributed, to individual non-intelligent local panels 504a-504h by coupling liquid source 502 to the respective inlet coupling 522a-522h. Non-intelligent local panels 504a-504h control the liquid supplied to drinking assemblies of individual specimen holding areas, having features and characteristics similar to drinking assemblies 212 and specimen holding areas 226, via individual, respective liquid carriers coupled to respective outlet couplings 524a-524h.

Individual interlock sensors 526a-526h are wired through the housings of their respective non-intelligent local panels 504a-504h to main panel 530 to provide feedback regarding interlock of the respective specimen holding area, or its drinking assembly, to the associated non-intelligent local panel 504a-504h. Interlock sensor status allows watering apparatus 500 to prevent spillage upon a determination that a drinking assembly is not attached to the respective outlet coupling 524a-524h. Through these interconnections, watering apparatus 500 accurately quantifies and controls the liquid supplied to the individual specimen holding areas as described herein with respect to watering apparatus 100.

In this embodiment of the present invention, one or more non-intelligent local panels 504a-504h may be monitored and controlled quickly, safely, and easily by a single user. Similar to the embodiment depicted in FIG. 4, this embodiment of the present invention is particularly advantageous for use in an environment housing a large quantity of animals and having limited personnel to patrol individual non-intelligent local panels 504a-504h. A single user located at user interface 520 may monitor all alarms for all non-intelligent local panels 504a-504h, and the respective specimen holding area or drinking assembly, while simultaneously monitoring each animal's liquid consumption and adjusting or overriding individual parameters for each non-intelligent local panel 504a-504h. Such alarms may include, but are not limited to, per event consumption alarms, per dispensational period consumption alarms, system disabled alarms, flow control device malfunction alarms, control unit malfunction alarms, communication failure alarms, measured flow out-of-range alarms, and alarms for disconnection of watering apparatus 500 from liquid source 502.

Figure 6:
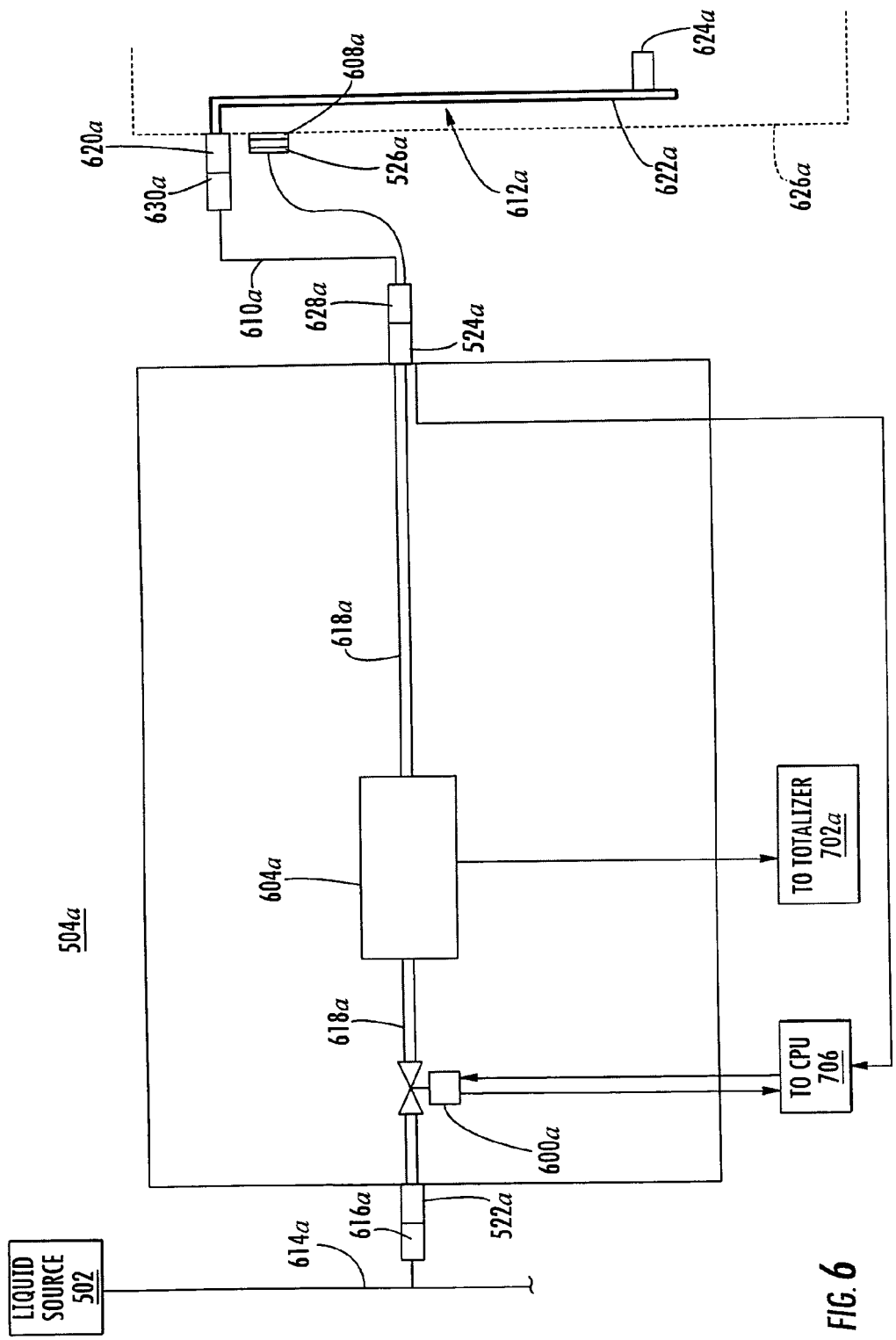
FIG. 6 depicts an internal view of a non-intelligent local panel in accordance with the embodiment of the present invention depicted in FIG. 5 including coupling of the non-intelligent local panel to a liquid source and a drinking assembly.

Turning now to FIG. 6, a cutaway, front view of non-intelligent local panel 504a of watering apparatus 500 in accordance with the embodiment depicted in FIG. 5 is illustrated including, inter alia, flow control device 600a and flow measurement device 604a. Although FIG. 6 depicts non-intelligent local panel 504a, non-intelligent local panels 504b-504h have identical characteristic and features as non-intelligent local panel 504a.

Prior to operation of watering apparatus 500, a user connects non-intelligent local panel 504a to liquid source 502 and drinking assembly 612a. Liquid source 502 typically includes a hose or similar device, such as inlet liquid carrier 614a, attached at a first end to liquid source 502 and attached either removably or permanently at a second end to liquid source coupling 616a, such as a quick disconnect fitting or a quick connect coupling. Inlet coupling 522a is designed for compatibility with commonly available liquid source couplings 616a to allow liquid source coupling 616a to be simply "plugged in" to inlet coupling 522a. After connection, liquid is capable of flowing from liquid source 502 to outlet coupling 524a through inlet liquid carrier 614a, liquid source coupling 616a, inlet coupling 522a, and watering apparatus liquid pathway 618a, the latter of which contains flow control device 600a and flow measurement device 604a.

Outlet coupling 524a is designed for attachment to a drinking assembly such as drinking assembly 612a. In the embodiment of the present invention depicted in FIG. 6, drinking assembly 612a includes drinking assembly coupling 620a, drinking assembly liquid pathway 622a, and drinking port 624a. In some embodiments, the drinking assembly is an integral part of, or is coupled to, an animal holding cage such as a vivarium or terrarium.

Outlet liquid carrier 610a, having outlet liquid carrier inlet and outlet couplings 628a and 630a, respectively, at each end, connects watering apparatus liquid pathway 618a to drinking assembly liquid pathway 622a via connection of outlet liquid carrier inlet coupling 628a to outlet coupling 524a and connection of outlet liquid carrier outlet coupling 530a to drinking assembly coupling 620a. Such a connection allows liquid flowing from liquid source 502 to flow though watering apparatus liquid pathway 618a and drinking assembly liquid pathway 622a to drinking port 624a under the regulation of flow control device 600a.

In this embodiment, liquid flow may be initiated by pressing drinking port 624a from a closed position to an open position. Also, upon successful connection of outlet liquid carrier 610a to non-intelligent local panel 504a and drinking assembly 612a, interlock sensor 526a is manually coupled to interlock mating device 608a to toggle the interlock status binary input of control unit 706 (FIG. 7), thereby notifying control unit 706 that drinking assembly 612a is properly coupled to non-intelligent local panel 504a. Such a notification allows liquid flow to occur if all other conditions are met and causes control unit 706 to illuminate interlock status indicator 514. Interlock sensor 526a serves the same purpose and function as interlock sensor 126 (FIG. 1). Consequently, interlock sensor 526a may be any of the interlock sensor embodiments discussed with respect to interlock sensor 126 (FIG. 1).

Upon manual attachment of interlock sensor 526a to interlock mating device 608a, a binary input of either "1" or "0" is sent to control unit 706 to indicate that a drinking assembly is interlocked with non-intelligent local panel 504a, and, consequently, liquid flow may occur through flow control device 600a. Although the embodiment depicted in FIG. 6 depicts an interlock sensor for connection to outlet coupling 524a only, alternate embodiments are envisioned having similar interlocks for connection to inlet coupling 522a, or other forms of feedback signals, without departing from the scope of the present invention. In these embodiments, control unit 706 may require positive confirmation of connections at both inlet and outlet couplings 522a and 524a, respectively, prior to allowing flow control device 600a to operate.

After connection of non-intelligent local panel 504a to both a liquid source and a drinking assembly, the user depresses reset button 512 and non-intelligent local panel 504a may be enabled. A user enables non-intelligent local panel 504a from user interface 520 (FIG. 5) by pressing selector button 528 as many times as necessary to cause specimen holding area indicator 532a to illuminate. After such illumination, all buttons and indicators present on user interface 520 pertain to non-intelligent local panel 504a as discussed below with respect to FIG. 7. Therefore, at this point, a user simply presses enable button 510 to enable non-intelligent local panel 504a.

When non-intelligent local panel 504a is disabled, flow control device 600a remains closed preventing liquid flow from liquid source 502. Upon initial enablement, the user must press drinking port 624a to the open position and depress air purge button 518. Upon depression of air purge button 518, flow control device 600a opens for a preset time period such that all air is removed from inlet hose 614a, liquid source coupling 616a, inlet coupling 522a, watering apparatus liquid pathway 618a including flow control device 600a and flow measurement device 604a, outlet coupling 524a, outlet liquid carrier inlet coupling 628a, outlet liquid carrier 610a, outlet liquid carrier outlet coupling 630a, drinking assembly coupling 620a, and drinking assembly liquid pathway 622a. As air is purged from the aforementioned pathway, this pathway fills with liquid derived from liquid source 502. Flow control device 600a closes after the preset time period has expired and all of the air is removed from the pathway. The user must then press drinking port 624a to the closed position and depress enable button 510. When non-intelligent local panel 504a is enabled and interlock sensor 526a is coupled to interlock mating device 608a, control unit 706 opens flow control device 600a and illuminates system status indicator 508.

Although the embodiment of the present invention depicted in FIG. 6 requires an automatic air purge, varying embodiments are envisioned having alternative automatic air purges or manual air purges. In these embodiments, automatic or manual air purge may be performed as discussed herein with respect to FIG. 2.

After either a manual or automatic air purge, drinking port 624a returns to its closed position after the liquid reaches drinking port 624a. After an automatic purge, control unit 706 is automatically notified that the liquid passing through flow measurement device 604a was not consumed by an animal, but was simply used to fill liquid and drinking assembly pathways 618a and 622a, respectively. Alternatively, after a manual purge, the user must manually send notification to control unit 706 by pressing reset button 512.

When the animal in specimen holding area 626a opens drinking port 624a, liquid from liquid source 502 flows to drinking port 524a via the aforementioned pathway and the quantity of liquid consumed by the animal is accurately measured by watering apparatus 500 as per a process such as the process discussed in greater detail above with respect to FIGS. 3A-3B. Furthermore, the quantity of liquid consumed during one drinking event or over a predetermined time period (e.g., twenty four hours), as well as the elapsed time between drinking events, may be controlled or limited by watering apparatus 500.

Although the present embodiment depicts one control unit 706 located in main user interface 520 to serve all non-intelligent local panels 504a-504h, alternate embodiments are envisioned in which each non-intelligent local panel 504a-504h is an intelligent local panel having its own dedicated control unit. In this embodiment, flow control device 600a, flow measurement device 604a, and interlock sensor 526a are wired to the local control unit. In this alternate embodiment, the local control units are connected to each other and to control unit 706 located in the main user interface panel via a communication bus. Flow data received by the local control units from the flow measurement devices 604a-604h is read locally by the control unit and transmitted to control unit 706 via the communication bus. In this scenario, control unit 706 transmits the flow data to the respective totalizer 506a-506h.

In an extension of this alternate embodiment, each intelligent local panel also contains a local totalizer that is wired to the local control unit. This aspect of this embodiment is particularly advantageous as it allows the user to read totalized flow data both locally at the intelligent local panels and remotely at the main user interface panel 530.

Figure 7:
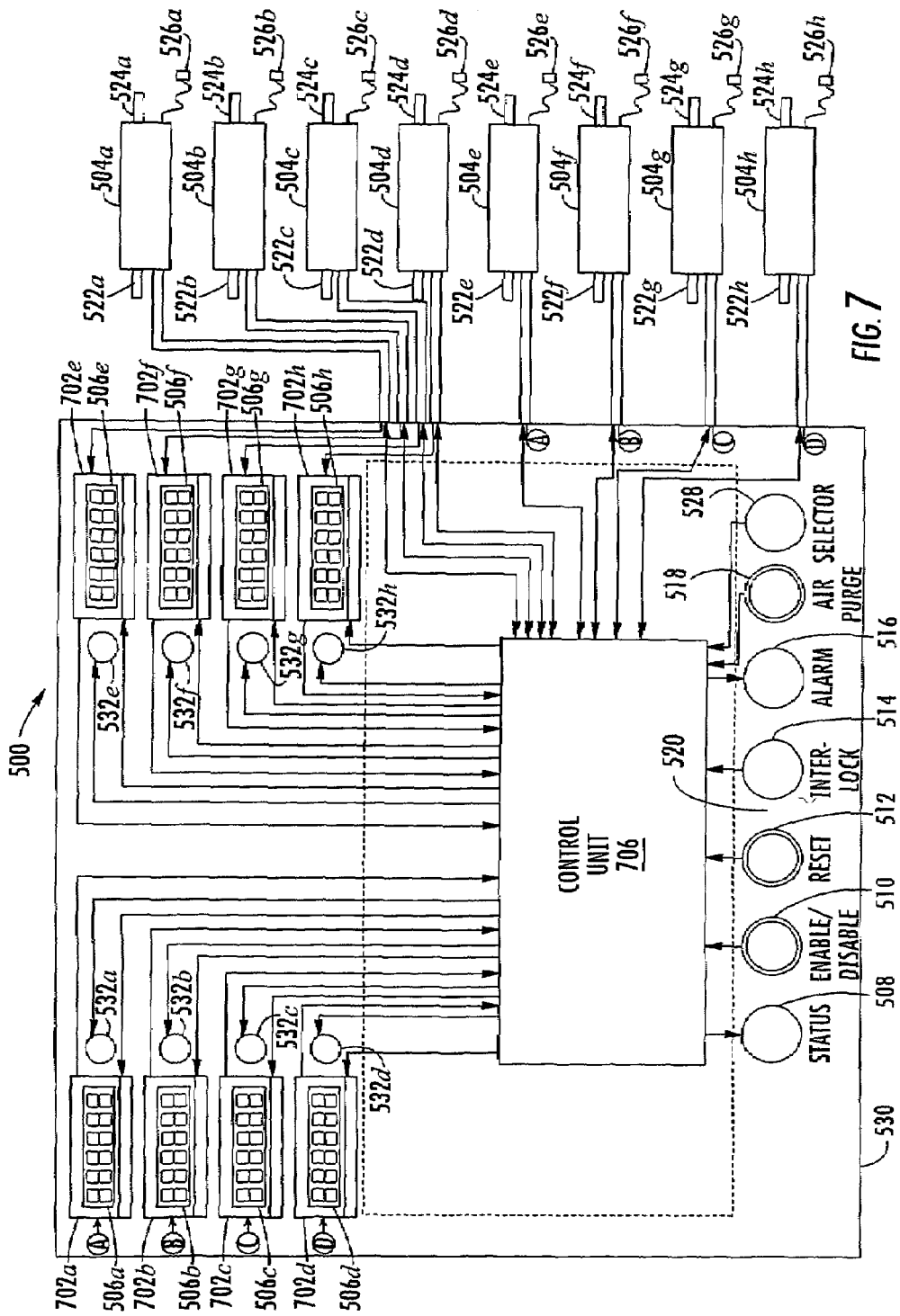
FIG. 7 depicts a cutaway, front view of the main user interface panel in accordance with the embodiment of the present invention depicted in FIG. 5 including a schematic interconnection of the internal and external components of the main user interface panel, as well as the coupling of the main user interface panel with each non-intelligent local panel.

Referring now to FIG. 7, a cutaway, front view of main panel 530 of watering apparatus 500 in accordance with the embodiment depicted in FIG. 5 is illustrated including, inter alia, user interface 520 and control unit 706. Control unit 706 monitors and controls watering apparatus 500, which includes non-intelligent local panels 504a-504h, based upon the execution of a process such as process 300 (FIGS. 3A-3C). Preferably, the processes are one or more algorithms programmed based upon a user's requirements and downloaded to control unit 706 or a portion thereof. However, other methods of loading control unit 706 (e.g., burning or programming an interchangeable EPROM, re-programming an EEPROM, programming a microprocessor, etc.) may be incorporated without departing from the scope of the present invention. Thereafter, parameter changes, calibration values, and the like may be implemented via re-downloading or re-burning control unit 706, or a portion thereof, with a revised process or entering the data via an independent user interface such as independent user interface 902 (FIG. 9) or via a user workstation such as user workstation 406 (FIG. 4) or user workstation 806 (FIG. 8).

Preferably, the process executed by control unit 706 receives input data from devices that are hardwired to control unit 706. More specifically, in the embodiment of the present invention depicted in FIGS. 5-7, control unit 706 receives binary inputs from selector, enable, and reset buttons 528, 510, and 512, respectively, and interlock sensors 526a-526h, as well as analog inputs from totalizers 702a-702h and flow control device(s) 600a-600h (FIG. 6).

Selector button 528 allows the user to select the specimen holding area to be monitored or controlled by depressing selector button 528 continually until the desired specimen holding area indicator 532a-532h is illuminated. Once the desired specimen holding area is selected, the user may depress enable or reset buttons 510 and 512, respectively, to enable or reset the selected non-intelligent local panel 504. System status indicator 508, interlock status indicator 514, and alarm status indicator 516 also indicate the status of the selected non-intelligent local panel 504.

For example, a user presses selector button 528 continually until a specific non-intelligent local panel 504a-504h is selected. Each time selector button 528 is pressed, control unit 706 receives a binary input signal that causes it to send a binary signal to the respective selector lamp 532a-532h. This sent signal causes the respective selector lamp of selector lamps 532a-532h to be illuminated, thereby indicating to the user which of the non-intelligent local panels 504a-504h has been selected. Similarly, when the user presses enable button 510 to enable or disable the selected non-intelligent local panel 504, enable button 510 sends a binary input of "1" for enable or a binary input of "0" for disable to control unit 706. Or, alternatively, watering apparatus 500 may be wired or programmed such that a binary input of "1" received from enable button 510 equates to disable and a binary input of "0" equates to enable. Upon receipt of the enable signal from enable button 510, the process executed by control unit 706 indexes the respective non-intelligent local panel 504 to enable via software. Reset button 512 is programmed and wired to operate in a similar fashion.

In contrast, each interlock sensor 526a-526h is wired to an independent binary input located at control unit 706. Therefore, each binary signal received from an interlock sensor 526a-526h is automatically associated with the respective non-intelligent local panel 504 based upon the binary input at control unit 706 that receives the signal. For example, interlock sensor 526a may be wired to binary input one, interlock sensor 526b may be wired to binary input two, interlock sensor 526c may be wired to binary input three, and so on. Therefore, the process executed by control unit 706 is programmed such that an input received on a specific binary input is automatically associated with one of the non-intelligent local panels 504a-504h.

In contrast to the "0" or "1" binary signals received from the aforementioned devices, totalizers 702a-702h, in the embodiment of the present invention depicted in FIG. 7, transmits analog signals to control unit 706. These analog signals are generated by totalizers 702a-702h based upon information received from flow measurement device(s) such as flow measurement device 600a depicted in FIG. 6. These flow measurement device(s) have similar functions and features as those discussed with respect to FIG. 2. The electric signals generated by the flow measurement device(s) are transmitted to totalizers 702a-702h, which convert them into real time flow and total flow data.

The individual total flow values, as calculated by totalizers 702a-702h, are transmitted to control unit 706 via individual, scaled 4-20 mA signals, or, alternatively, any signals compatible with control unit 706 (e.g., a zero to ten volt direct current signal, a zero to twenty mA signal, a pulsed binary contact, etc.). In addition to sending totalized flow data to control unit 706, totalizers 702a-702h also display the individual totalized result on the respective totalizer display 506a-506h. In the embodiment depicted in FIGS. 5 and 7, totalizer displays 506a-506h are integral LED or LCD displays mounted through the face of main user interface panel 530 such that totalizer displays 506a-506h form a part of user interface 520. At the end of a watering period for a specific non-intelligent local panel 504a-504h, as discussed in greater detail above with respect to FIGS. 1 and 2, control unit 706 resets the respective totalizer 702a-702h and the respective totalizer display 506a-506h to zero.

In an alternate embodiment, totalizers 702a-702h are eliminated. In this embodiment, the flow measurement devices transmit data directly to control unit 706, which totalizes the data and, optionally, transmits the totalized result to one or more standalone displays (i.e., a display that is not integral to a totalizer or totalizing device) via analog or binary signals generated by control unit 706. In this embodiment, the totalized data may be reset to zero as a function, or software interlock, of a process programmed into control unit 706 rather than via a hardwired input.

The process executed by control unit 706 receives the analog and binary input data discussed above and uses such data to generate and transmit output signals to actuate flow control devices 600a-600h, to reset totalizers 702a-702h, and to illuminate system status indicator 508, interlock status indicator 514, and alarm status indicator 516. Such process is performed similar to the process discussed in greater detail above with respect to FIGS. 3A-3C.

Referring now to FIG. 8, depicted is networked watering system 801 including multiple non-intelligent local panels 804 networked to main panel 830 and to user workstation 806. In this embodiment, one non-intelligent local panel 804 is provided for each specimen cage 808 (e.g., a vivarium, terrarium, etc.) and a user may monitor and control all non-intelligent local panels 804 remotely from main user interface panel 830.

Each non-intelligent local panel 804 has features and characteristics similar to non-intelligent local panels 504a-504h described in detail herein with respect to FIGS. 5-7. In this scenario, each non-intelligent local panel 804 is connected to liquid source 802 which is piped, or otherwise distributed, to individual specimen cages 808 located throughout the specimen holding area 814 by coupling liquid source 802 to the respective inlet couplings 822. Each non-intelligent local panel 804 provides a controlled liquid supply to the respective specimen cage 808 via individual, respective liquid carriers 810 coupled to outlet couplings 824 and cage couplings 820. Individual interlock sensors 826 are also wired through its respective non-intelligent local panel 804 to a control unit located in main user interface panel 830 to provide feedback regarding the connection of specimen cage 808, or its internal drinking assembly, to liquid carrier 810. Through these interconnections, non-intelligent local panels 804 accurately quantify and control the liquid supplied to specimen cages 808 as described herein with respect to non-intelligent local panel 502a.

However, in addition to the features and characteristics of non-intelligent local panel 504a, the networking of one or more main user interface panels 830 to one or more user workstations 806 allows bi-directional communication to occur between all networked components. Such bi-directional communication enhances the safety and ease with which non-intelligent local panels 804 may be monitored and controlled.

In this embodiment of the present invention, one or more non-intelligent local panels 804 may be monitored and controlled quickly, safely, and easily by a single user. This aspect of the present invention is particularly advantageous for use in an environment housing a large quantity of animals and having limited personnel to patrol individual non-intelligent local panels 804. A single user located at user workstation 806 may monitor all alarms for all non-intelligent local panels 804 while simultaneously monitoring each animal's liquid consumption and adjusting or overriding individual parameters for each non-intelligent local panels 804. Such alarms may include, but are not limited to, per event consumption alarms, per dispensational period consumption alarms, system disabled alarms, flow control device malfunction alarms, control unit malfunction alarms, communication failure alarms, measured flow out-of-range alarms, and alarms for disconnection of non-intelligent local panels 804 from liquid source 802 and/or specimen cage 808 or its internal drinking assembly.

Additionally, one or more of the aforementioned alarms may be programmed for automatic disposition. For example, one or more specific alarms may be programmed for automatic printing at any one or more user workstations 806. Or, alternatively, one or more specific alarms may be programmed for automatic transmission via electronic mail from a user workstation 806 to a device such as a remote personal computer, handheld PDA, cellular telephone, alphanumeric pager, digital pager, etc. Or, in yet another alternate embodiment, one or more specific alarms may be programmed for transmission via a short haul modem to a non-electronic mail paging system. Many other methods of alarm disposition other than those specifically enumerated herein may be incorporated without departing from the scope of the present invention.

In addition to receiving alarms, users of non-intelligent local panels 804 may perform all monitoring and control from any user workstation 806 for a specific non-intelligent local panel 804. For example, a user may override the pre-programmed consumption limits for each individual animal as necessary to achieve the objectives of the experiments. Or, a user may modify the permanent programmed data such as the length of the dispensational periods, the per event time limits, and per event and dispensational period consumption limits. Users may also override or control non-intelligent local panels 804 devices. For example, users may remotely enable, disable, or reset a non-intelligent local panel 804. In addition, users may override all outputs including, but not limited to, the flow control device. Furthermore, calibration values may also be entered via user workstation 406.

In some embodiments, modem 836 is included. Modem 836 may be coupled to either main user interface panel 830 or user workstation 806. A telephone line is also coupled to modem 836 to connect it to a public telephone system. This connection allows a user that is remote from both user workstation 806 and main user interface panel 830 to connect to the latter by placing a telephone call with a personal computer to the networked watering system 801. Upon a successful connection, a user may perform all monitoring and control as if the user were seated at a user workstation 806.

Similarly, embodiments are envisioned that include Internet interfaces 828 (e.g., cable modem, DSL modem, wireless router, Ethernet cable, etc.). Internet interface 828 may be coupled to main user interface panel 830, user workstation 806, or directly to communication bus 832. This connection allows a user that is remote from both user workstation 806 and main user interface panel 830 to connect to the latter by accessing a web site programmed to access networked watering system 801. Upon successful connection to the web site, a user may perform all monitoring and control as if the user were seated at a user workstation 806.

Turning next to FIG. 9, depicted is independent user interface 902 in accordance with multiple embodiments of the present invention. User interface 902 connects to control unit 906 via cable 910. Control unit 906 has similar functions and features as described herein with respect to control unit 206 (FIG. 2) and 706 (FIG. 7). A user may enter or modify control parameters or other data by pressing the buttons on keypad 904 to toggle through the various parameters displayed on independent user interface display 908 until the desired parameter is displayed. New or modified data may then be entered for the parameter via keypad 904. In addition to modifying control parameters, independent user interface 902 allows a user to perform all of the actions available at a local user interface such as user interfaces 120, 418, and 520 including, but not limited to, enabling and disabling the attached watering apparatus, viewing status and alarm points, viewing consumption data, etc.

Although embodiments have been discussed herein in which devices are hardwired to control units and network communication buses are hardwired between networked devices, any such wiring discussed herein may be replaced with a wireless connection and associated transmitters and receivers without departing from the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for watering animals comprising:
   at least one control unit executing at least one algorithm;
   at least one flow measurement device coupled to said at least one control unit for measuring at least one flow of at least one liquid consumed by at least one of said animals; and
   at least one purge mechanism coupled to said control unit;
   wherein said algorithm utilizes data collected from said at least one flow measurement device to quantify said at least one liquid consumed by at least one of said animals; and
   wherein said algorithm utilizes data collected from said purge mechanism to increase at least one accuracy of at least one of said quantities of said at least one liquid consumed by at least one of said animals.

2. An apparatus according to claim 1 further comprising:
   at least one flow control device coupled to said at least one control unit for controlling at least one flow of at least one liquid consumed by at least one of said animals.

3. An apparatus according to claim 2, wherein said at least one flow control device provides a feedback signal to said at least one control unit.

4. An apparatus according to claim 2, wherein said at least one purge mechanism opens said at least one flow control device for a preset time period.

5. An apparatus according to claim 1 further comprising:
   at least one totalizer coupled to at least one of the group consisting of said at least one control unit, said at least one flow measurement device, and combinations thereof.

6. An apparatus according to claim 1 further comprising:
   at least one liquid pathway coupled to said at least one flow measurement device for receiving at least one liquid from a liquid source and providing said liquid to a drinking assembly.

7. An apparatus according to claim 6 further comprising:
   at least one coupling coupled to said at least one liquid pathway for connecting said apparatus to at least one of the group consisting of said liquid source, said drinking assembly, and combinations thereof.

8. An apparatus according to claim 6 further comprising:
   at least one leak detection sensor coupled to said at least one control unit and said at least one liquid pathway.

9. An apparatus according to claim 6, wherein said at least one purge mechanism purges air from said at least one liquid pathway.

10. An apparatus according to claim 1 further comprising:
    at least one interlock sensor coupled to said control unit for indicating at least one of the group consisting of connection of said apparatus to a liquid source, disconnection of said apparatus from said liquid source, connection of said apparatus to a drinking assembly, disconnection of said apparatus from said drinking assembly, a leak, and combinations thereof.

11. An apparatus according to claim 10, wherein said at least one interlock sensor includes at least one of the group consisting of a magnetic interlock sensor, an infrared interlock sensor, a mechanically-activated interlock sensor, and combinations thereof.

12. An apparatus according to claim 1, wherein said algorithm indicates at least one of the group consisting of a high liquid flow condition, a low liquid flow condition, and combinations thereof based upon said data collected from said at least one flow measurement device.

13. An apparatus according to claim 1, wherein said at least one of said quantities of said at least one liquid consumed by said at least one of said animals is limited to at least one of the group consisting of a first quantity consumed during at least one dispensational period, a second quantity consumed during a drinking event, and combinations thereof.

14. An apparatus according to claim 1,
    wherein said apparatus prevents said animal from performing a second drinking event until a predetermined time period lapses; and
    wherein said predetermined time period is measured from a conclusion of a first drinking event.

15. An apparatus according to claim 1, wherein said at least one purge mechanism is activated by at least one of said animals.

16. An apparatus according to claim 1 further comprising:
    at least one water sensor coupled to said at least one control unit.

17. An apparatus according to claim 1 further comprising:
    at least one user interface coupled to said at least one control unit for indicating at least one of the group consisting of a status, an alarm, and a totalized liquid consumption.

18. An apparatus according to claim 17, wherein said alarm is at least one of the group consisting of a per event consumption alarm, a per dispensational period consumption alarm, a system disabled alarm, a flow control device malfunction alarm, a control unit malfunction alarm, a communication failure alarm, a measured flow out-of-range alarm, a disconnection of said apparatus from a drinking assembly alarm, a disconnection of said apparatus from a liquid source alarm, and combinations thereof.

19. An apparatus according to claim 1, wherein said at least one purge mechanism includes at least one of the group consisting of a water sensor, a second one of said at least one flow measurement device, and combinations thereof.

20. An apparatus according to claim 1, wherein said at least one purge mechanism includes setting at least one value of said at least one algorithm to zero.

21. An apparatus according to claim 1, wherein said at least one purge mechanism changes a value of at least one reset parameter of said at least one algorithm.

22. An apparatus according to claim 1, wherein a first of said apparatus communicates with at least one of a second of said apparatus via a network.

23. An apparatus according to claim 22, wherein said communication is bi-directional.

* * * * *